(12) United States Patent
Haile et al.

(10) Patent No.: US 7,416,803 B2
(45) Date of Patent: *Aug. 26, 2008

(54) SOLID ACID ELECTROLYTES FOR ELECTROCHEMICAL DEVICES

(75) Inventors: Sossina M. Haile, Altadena, CA (US); Calum Chisholm, Pasadena, CA (US); Ryan B. Merle, Kent, WA (US); Dane A. Boysen, Pasadena, CA (US); Sekharipuram R. Narayanan, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 10/211,882

(22) Filed: Aug. 1, 2002

(65) Prior Publication Data

US 2003/0104258 A1  Jun. 5, 2003

Related U.S. Application Data

(63) Continuation-in-part of application No. 09/439,377, filed on Nov. 15, 1999, now Pat. No. 6,468,684.

(60) Provisional application No. 60/355,362, filed on Feb. 6, 2002, provisional application No. 60/309,807, filed on Aug. 1, 2001, provisional application No. 60/151,811, filed on Aug. 30, 1999, provisional application No. 60/146,946, filed on Aug. 2, 1999, provisional application No. 60/116,741, filed on Jan. 22, 1999.

(51) Int. Cl.
 *H01M 8/10*  (2006.01)
 *C25B 13/04*  (2006.01)
 *B01D 71/02*  (2006.01)
 *C01B 25/30*  (2006.01)
 *C01B 25/32*  (2006.01)

(52) U.S. Cl. .............. 429/33; 204/295; 95/55; 423/305; 423/306; 423/308; 423/312

(58) Field of Classification Search ............. None
See application file for complete search history.

(56) References Cited

U.S. PATENT DOCUMENTS 4,632,847 A  12/1986 Lomasney et al.

(Continued)

FOREIGN PATENT DOCUMENTS

DE  3110571 A1  9/1982

(Continued)

OTHER PUBLICATIONS

Alberti, et al., "Solid State Protonic Conductors, Present Main Applications and Future Prospects," *Solid State Ionics*, Mar. 20, 2001, pp. 3-16, vol. 145, Elsevier Science B.V.

(Continued)

*Primary Examiner*—Jonathan Crepeau
(74) *Attorney, Agent, or Firm*—Townsend and Townsend and Crew LLP

(57) ABSTRACT

Improved solid acid electrolyte materials, methods of synthesizing such materials, and electrochemical devices incorporating such materials are provided. The stable electrolyte material comprises a solid acid capable undergoing rotational disorder of oxyanion groups and capable of extended operation at elevated temperatures, that is, solid acids having hydrogen bonded anion groups; a superprotonic, trigonal, tetragonal, or cubic, disordered phase; and capable of being operating at temperatures of ~100° C. and higher.

32 Claims, 19 Drawing Sheets

U.S. PATENT DOCUMENTS

| | | | |
|---|---|---|---|
| 4,659,559 | A | 4/1987 | Struthers |
| 4,664,683 | A | 5/1987 | Degen et al. |
| 4,836,911 | A | 6/1989 | Skeels, Gary W. et al. |
| 4,985,315 | A | 1/1991 | Lemoine |
| 5,260,821 | A | 11/1993 | Chu et al. |
| 5,308,808 | A | 5/1994 | Gregar et al. |
| 5,344,548 | A | 9/1994 | Alberti et al. |
| 5,436,094 | A | 7/1995 | Horimoto et al. |
| 5,506,075 | A | 4/1996 | Iwasaki et al. |
| 5,559,638 | A | 9/1996 | Aoki et al. |
| 5,573,648 | A | 11/1996 | Shen et al. |
| 5,576,115 | A | 11/1996 | Capuano et al. |
| 5,591,545 | A | 1/1997 | Miyashita et al. |
| 5,682,261 | A | 10/1997 | Takada et al. |
| 5,766,799 | A | 6/1998 | Hong |
| 5,840,375 | A | 11/1998 | Katsumi et al. |
| 6,001,507 | A | 12/1999 | Ono et al. |
| 6,059,943 | A | 5/2000 | Murphy et al. |
| 6,121,727 | A | 9/2000 | Kanai et al. |
| 6,153,333 | A | 11/2000 | Barker |
| 6,468,684 | B1 | 10/2002 | Chisholm et al. |
| 7,125,621 | B2 * | 10/2006 | Haile et al. ............... 429/33 |
| 2007/0009778 | A1 * | 1/2007 | Chisholm et al. ......... 429/33 |

FOREIGN PATENT DOCUMENTS

| | | |
|---|---|---|
| EP | 0702376 A1 | 3/1996 |
| EP | 0818841 A1 | 1/1998 |
| JP | 63 239781 | 10/1988 |
| WO | WO 00/45447 | 8/2000 |

OTHER PUBLICATIONS

Boysen, et al., "Polymer Solid Acid Composite Membranes for Fuel-Cell Applications," *Journal of the Electrochemical Society*, 2000, pp. 3610-3613, vol. 147, The Electrochemical Society, Inc.

Chisholm, et al., "Structure and Thermal Behavior of the New Superprotonic Conductor $Cs_2(HSO_4)(H_2PO_4)$," *Acta Crystallographica*, 1999, pp. 937-946, Section B55, International Union of Crystallography, Great Britain.

Chisholm, et al., "Superprotonic Behavior of $Cs_2(HSO_4)(H_2PO_4)$—A New Solid Acid in the $CsHSO_4$-$CsH_2PO_4$ System," *Solid State Ionics*, 2000, pp. 229-241, vols. 136-137, Elsevier Science B.V.

Chisholm, et al., "Superprotonic Phase Transition in $CsH(PO_3H)$," *Chemistry Materials*, Mar. 20, 2002.

Chisholm, et al., "Synthesis, Structure, and Properties of Compounds in the $NaHSO_4$-$CsHSO_4$ System. 1. Crystal Structures of $Cs_2Na(HSO_4)_3$ and $CsNa_2(HSO_4)_3$," *Chemistry Materials*, Jul. 17, 2001, pp. 2574-2583, vol. 13, No. 8, American Chemical Society.

Chisholm, et al., Synthesis, Structure, and Properties of Compounds in the $NaHSO_4$-$CsHSO_4$ System. 2. The Absence of Superprotonic Transitions in $Cs_2Na(HSO_4)_3$ and $CsNa_2(HSO_4)_3$, *Chemistry Materials*, Aug. 21, 2001, pp. 2909-2912, vol. 13, No. 9, American Chemical Society.

Cooksley, et al., "Crystal Structure of Monoclinic $NaCaHSiO_4$," *Acta Crystallographica*, Apr. 15, 1974, pp. 864-867, Section B30, Part 4, International Union of Crystallography, Great Britain.

Felsche, et al., "Thermal Studies on Sodium Silicate Hydrates. II. Disodium Dihydrogensilicate Hydrates, $Na_2H_2Si_2SiO_4 \cdot n\ H_2O$ (n=4, 5, 7, 8): Melting Characteristics and Solidification of Glasslike Hydrate Phases at Low Temperatures," *Thermochimica Acta.*, Jun. 15, 1984, pp. 109-121, vol. 77, Nos. 1-3, Elsevier Science B.V.

Haile, "Hydrogen Bonding and Phase Transitions in Proton-Conducting Solid Acids," *Mat. Res. Soc. Symp. Proc.*, 1999, pp. 315-326, vol. 547.

Haile, et al., "Single-Crystal Neutron Diffraction Study of $\beta$-$Cs_3(HSO_4)_2[H_{2-x}(S_xP_{1-x})O_4]$ (x≈0.5) at 15 K," *Acta Crystallographica*, 1999, pp. 285-296, Section B55, International Union of Crystallography, Great Britain.

Haile, et al., "Solid Acids as Fuel Cell Electrolytes," *Nature*, Apr. 19, 2001, pp. 910-913, vol. 410.

Haile, et al., "Structure and Vibrational Spectrum of $\beta$-$Cs_3(HSO_4)_2[H_{2-x}(P_{1-x}S_x)O_4]$ (x~0.5) a New Superprotonic Conductor, and a Comparison with $\alpha$-$Cs_3(HSO_4)_2(H_2PO_4)$," *Journal of Solid State Chemistry*, 1998, pp. 373-387, vol. 139, Academic Press.

Haile, et al., "X-Ray Diffraction Study of $Cs_5(HSO_4)_3(H_2PO_4)_2$ a New Solid Acid with a Unique Hydrogen-Bond Network," *Journal of Solid State Chemistry*, 1998, pp. 251-265, vol. 140, Academic Press.

Lavrova, et al., "Disordering of Pentacesium Trihydrogen Tetrasulfate in $Cs_5H_3(SO_4)_4$-$SiO_2$ Composite Proto Electrolytes," *Inorganic Materials*, 2002, vol. 38, No. 11, pp. 1172-1177.

Ponomareva, et al., "Effect of $SiO_2$ morphology and pores size on the proton nanocomposite electrolytes properties," Solid State Ionics, 1999, 119, pp. 295-299.

Ponomareva, et al., "Composite protonic solid electrolytes in $CsHSO_4$-$SiO_2$ system," State Ionics, 1996, 90, pp. 161-166.

Ponomareva, et al., "The influence of heterogeneous dopant porous structure on the properties of protonic solid electrolyte in the $CsHSO_4$-$SiO_2$ system," Solid State Ionics, 1999, 118, pp. 317-323.

Ponomareva, et al., "Composite protonic electrolytes in the system $(NH_4)_3H(SO_4)_2$-$SiO_2$," Solid State Ionics, 2001, 145, pp. 205-210.

Ponomareva, et al., "The investigation of disordered phases in nanocomposite proton electrolytes based on $MeHSO_4$ (Me=Rb, Cs,K)," Solid State Ionics, 2001, 145, pp. 197-204.

Jamieson, et al., "Sodium Silicate Hydrates. I. Crystallographic Data," *Acta Crystallographica*, Mar. 10, 1996, pp. 373-376, vol. 20, Part 3, International Union of Crystallography, Great Britian.

Lewis, "Hawley's Condensed Chemical Dictionary," Thirteenth Edition, p. 910, John Wiley & Sons, Inc. (1997)

Meunier, et al., "Pulsed Laser Deposition of Superionic Ceramic Thin Films: Deposition and Applications in Electrochemistry," *Applied Surface Science*, 1998, pp. 466-470, vol. 127-129, Elsevier Science B.V.

Mhiri, "Hydrogen Bonding in $Cs_{1-x}M_xHSO_4$ Protonic Conductors," *Solid State Ionics*, May. 1993, pp. 187-191, vol. 61, No. 1-3, Elsevier Science B.V.

Münster, et al., "Periodical for Inorganic and General Chemistry," *Notebook 5-6*, Nov. 1965, pp. 225-360, vol. 340, Johann Ambrosius Barth Publishing, Leipzig.

Pfeiffer, et al., "Synthesis of Lithium Silicates," *Journal of Nuclear Materials*, 1998, pp. 309-317, vol. 257, Elsevier Science B.V.

Politova, et al., "Ethylene Hydrogenation in Electrochemical Cell with Solid Proton-Conducting Electrolyte," *Reaction Kinetics & Catalysis Letters*, 1990, pp. 321-326, vol. 41, No. 2, Elsevier Science B.V.

Gargouri, M. et al., "Phase Transitions and Electrical Properties of CSH(SO4)(SeO4) Mixed Crystals," October 1997, Solid State Ionics, vol. 100, Nos. 3,4, pp. 225-232.

Haile. S. M. et al., "Superprotonic Conductivity in Cs3(HSO4)(H2PO4),"1995, Solid State Ionics, vol. 77, pp. 128-134.

Ohi, K. et al., "Ferroelectric Phase Transition in Rb2So4-(NH4)2SO4 and Cs2SO4-(NH4)2SO4 Mixed Crystals," Feb. 1978, Journal of the Physical Society of Japan, 44(2), pp. 529-536.

Volkov, V. L., et al., "Cesium Ammonium Dihadrogen Arsenate Hydrates," Apr. 1997, Inorganic Materials (Translations of Neogranicheskie Materialy) 33(4), 496-499.

Zaidi, S. M. J. et al., "Solid Polymer Composite Electrolytes for PEMFC," 1998, *Proc. Intersoc. Energy Convers. Eng. Conf.*, vol. 33.

* cited by examiner (a)

(b)

SOLID ACID ELECTROLYTES FOR ELECTROCHEMICAL DEVICES

CROSS-REFERENCE TO RELATED APPLICATIONS

This application is a continuation-in-part of U.S. application Ser. No. 09/439,377, filed Nov. 15, 1999, now U.S. Pat. No. 6,468,684, which claims priority to U.S. Provisional Application Nos. 60/116,741, filed Jan. 22, 1999; 60/146,946, filed Aug. 2, 1999; and 60/151,811, filed Aug. 30, 1999, the disclosures of which are fully incorporated herein by reference; and this application also claims priority to U.S. Provisional Application Nos. 60/309,807, filed Aug. 1, 2001; and 60/355,362, filed Feb. 6, 2002, the disclosures of which are also fully incorporated herein by reference.

STATEMENT AS TO FEDERALLY SPONSORED RESEARCH

The invention described herein was made in performance of work under contracts to the National Science Foundation [DMR-9902882] and the Office of Naval Research [N00014-01-1-0304 and N00014-02-1-0192], and is subject to the provisions of Public Law 96-517 (U.S.C. 202) in which the Contractor has elected to retain title.

FIELD OF THE INVENTION

The present invention relates to electrolytes for electrochemical devices, methods of synthesizing such materials, and electrochemical devices incorporating such materials; and more particularly to electrolytes made from novel solid acid materials.

BACKGROUND OF THE INVENTION

Electrochemical devices depend on the flow of protons, or the flow of both protons and electrons, through a proton conducting material, such as a membrane. Accordingly, materials which conduct protons, or both protons and electrons, have applications as electrolytes or electrodes in a number of electrochemical devices including fuel cells, electrochemical or supercapacitors, sensors, hydrogen separation membranes and membrane reactors.

One particularly important application for these materials is in fuel cells. Fuel cells are attractive alternatives to combustion engines for a wide variety of applications, because of their higher efficiency and the lower level of pollutants produced from their operation. There are three common types of fuel cells relevant to this patent: 1) a direct hydrogen/air fuel cell system, which stores hydrogen and then delivers it to the fuel cell as needed; 2) an indirect hydrogen/air fuel cell, in which hydrogen is generated on site from a hydrocarbon fuel, cleaned of carbon monoxide, and subsequently fed to the fuel cell; and 3) a direct methanol fuel cell ("DMFC"), which feeds a methanol/water solution directly to the fuel cell. An example of this later fuel cell was described, for example, in U.S. Pat. No. 5,559,638, the disclosure of which is incorporated herein by reference.

Regardless of the fuel cell design chosen, the operating efficiency of the device is limited by the efficiency of the electrolyte at transporting protons. Typically, perflourinated sulphonic acid polymers, polyhydrocarbon sulfonic polymers, and composites thereof are used as electrolyte membrane materials for fuel cell. However, these conventional materials utilize hydronium ions ($H_3O^+$) to facilitate proton conduction. Accordingly, these materials must be hydrated, and a loss of water immediately results in degradation of the conductivity of the electrolyte and therefore the efficiency of the fuel cell. Moreover, this degradation is irreversible, i.e., a simple reintroduction of water to the system does not restore the conductivity of the electrolyte.

As a result, fuel cells utilizing these materials require peripheral systems to ensure water recirculation and temperature control to keep the water from evaporating. Not only do these systems increase the complexity and cost of these fuel cells, but because the system cannot exceed a temperature of 100° C. the fuel cell catalysts and other systems cannot be operated a maximum efficiency. Higher temperatures would also reduce carbon monoxide poisoning of the fuel cell catalyst.

It has recently been shown that the solid acids such as $CsHSO_4$ can be used as the electrolyte in fuel cells operated at temperatures of 140-160° C. Use of this material greatly simplifies fuel cell design relative to polymer electrolyte fuel cells because hydration of the electrolyte is not necessary and, because of the elevated temperature of operation, residual CO in the fuel stream can be better tolerated. The high conductivity of $CsHSO_4$ and analogous materials results from a structural phase transition that occurs at 141° C. from an ordered structure, based on chains of $SO_4$ groups linked by well-defined hydrogen bonds, to a disordered structure in which $SO_4$ groups freely reorient and easily pass protons between one another. Thus, disorder in the crystal structure is a key prerequisite for high proton conductivity.

Ultimately, solid acid electrolytes may solve many of the problems facing state-of-the-art polymer based fuel cells. These problems include inability to operate at temperatures above 100° C. (which would increase the CO tolerance of the Pt catalyst), humidification requirements, and methanol permeation across the electrolyte. The technological objectives of this work are thus to simply fuel cell operation by use of alternative electrolytes. However, the lifetime of these sulfate and selenium based solid acids is insufficient for commercial applications. The poor lifetime of both $CsHSO_4$ and $CsHSeO_4$ under fuel cell operating conditions results from the reduction of sulfur and selenium by hydrogen in the presence of typical fuel cell catalysts, according to:

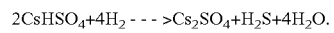

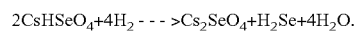

Accordingly, a need exists for solid acid compounds with high proton conductivity that are stable under fuel cell conditions, and processing methodologies that lead to high performance membrane-electrode-assemblies (MEAs) based on these solid acid compounds.

SUMMARY OF THE INVENTION

Accordingly, the present invention is directed to a stable electrolyte material comprising a solid acid capable of forming hydrogen bonds and undergoing rotational disorder capable of extended operation at elevated temperatures, such as, for example, solid acids having a tetrahedral or octahedral hydrogen bonding anion group; a superprotonic trigonal disordered phase; and/or being capable of operating at temperatures of ~100° C. Specifically, the current invention is directed to several classes of improved solid acid electrolyte materials, methods of synthesizing such materials, and electrochemical devices incorporating such materials.

In one embodiment, the invention is directed to an electrolyte comprising a solid acid having a superprotonic trigonal phase. In one such embodiment, the solid acid may be chosen from phosphate species of the general form: $(M_xM'_{1-x})_3H_{3x}(PO_4)_2$, where M is any alkali or transition metal or other functional group having a +1 charge, such as, $Li^+ \ldots Cs^+$, $NH_4^+$; and M' is any alkaline earth or transition metal having a +2 charge, such as $Mg^{2+} \ldots Ba^{2+}$, $Pb^{2+}$. Alternatively, the solid acid may directed to a mixed phosphate compound having the general form: $M_3H_{2x}[(P_{1-x}, Si_x)O_4]_2$ or $M_xH_{2x}[(P_{1-x},Ge_x)O_4]_2$ where M is any alkaline or transition metal having a +2 charge, such as $Mg^{2+} \ldots Ba^{2+}$, $Pb^{2+}$.

In another embodiment, the invention is directed to an electrolyte comprising a solid acid having a tetrahedral anion chosen from the group $PO_4$, $PO_3F$ and $PO_3H$. In such an embodiment, the solid acid may be of the general form: $MH_{1+x}(PO_3A)_{1-x}(PO_4)_x$ and $M_3Hx[(PO_3A)_x(PO_4)_{1-x}]_2$, where M is any alkali metal or other functional group having a +1 charge, such as, $Li^+ \ldots Cs^+$, $NH_4^+$, and A is F or H. Thus, the solid acid species may be chosen from monofluorophosphate and phosphite species or from mixed monoflurophosphate/phosphate and mixed phosphite/phosphate species. Finally, the solid acid species may also be chosen from molecules having mixed chromate/phosphate tetrahedral anion species. Such molecules have the general form: $MH_{1+x}(CrO_4)_{1-x}(PO_4)_x$ and $M_3Hx[(CrO_4)_x(PO_4)_{1-x}]_2$, where M is any alkaline metal or other functional group having a +1 charge, such as, $Li^+ \ldots Cs^+$, $NH_4^+$.

In still another embodiment, the invention is directed to an electrolyte comprising a solid acid having an octahedral anion. In such an embodiment, the solid acid may be chosen from fluorosilicates and germanates of the general form: $MHSiF_6$ and $MHGeF_6$, where M is any alkaline metal or other functional group having a +1 charge, such as, $Li^+ \ldots Cs^+$, $NH_4^+$. The solid acid may also be chosen from mixed phosphosilicates and phosphogermanates of the general form: $MH_x(P_{1-x}Si_x)F_6$ and $MH_x(P_{1-x}Ge_x)F_6$, where M is any alkaline metal or other functional group having a +1 charge, such as, $Li^+ \ldots Cs^+$, $NH_4^+$. The solid acid may also be chosen from compounds with aluminum flouride octahedral anion groups $AlF_6$.

In yet another embodiment, the invention is directed to a membrane comprising the solid acid electrolyte. In such an embodiment, the invention may further comprise a structural binder or matrix material to enhance the mechanical integrity and/or chemical stability of the membrane. In these embodiments the binder may comprise any suitable stabilizing material, such as, for example a polymer, a ceramic, or an oxide glass.

In still yet another embodiment, the invention is directed to an electronically conducting matrix material, such as a metal or a carbon based material.

In still yet another embodiment, the invention is directed to methods of synthesizing the solid acids according to the current invention.

In still yet another embodiment, the invention is directed to an electrochemical device incorporating the solid acid electrolyte. In such an embodiment the electrolyte may be incorporated into any electrochemical device requiring a flow of either protons or protons and electrons across a membrane to function, such as, for example, a fuel cell, a hydrogen separation membrane, or an electrolysis cell.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

Figure 1A:
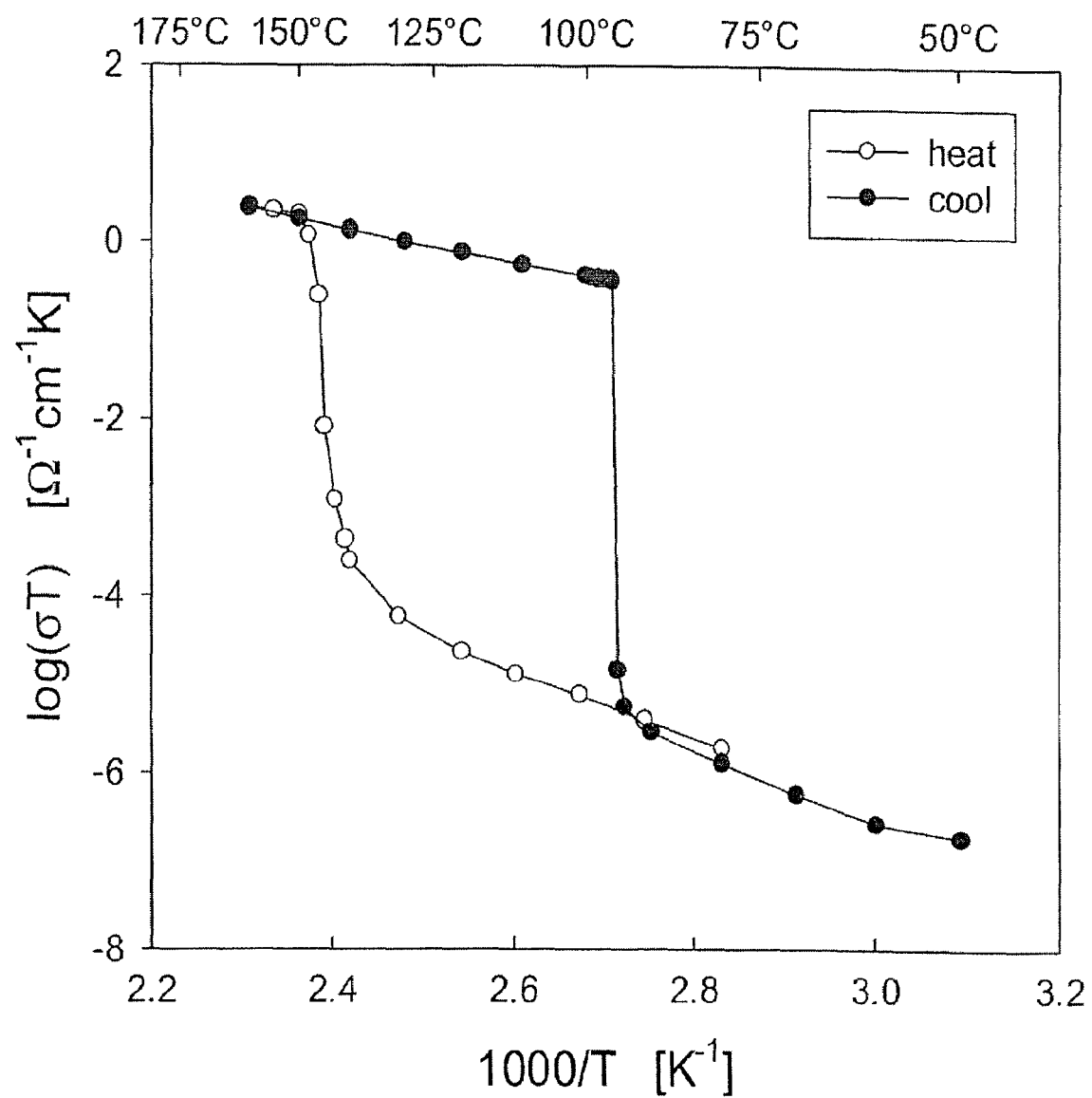
FIGS. 1a to 1e show graphical representations of the properties of an exemplary $CsH(PO_3H)$ solid acid according to the current invention.

The present invention is directed to a stable electrolyte material comprising a solid acid capable of forming hydrogen bonds and undergoing rotational disorder and capable of extended operation at elevated temperatures, such as, for example, solid acids having a tetrahedral or octahedral hydrogen bonding anion group; a superprotonic trigonal, tetragonal or cubic disordered phase; and/or being capable of operating at temperatures of 100° C. and higher. Such materials are referred to as "solid acid electrolytes" or "electrolytes" herein.

The term solid acids used herein refers to compounds which have properties that are intermediate between those of a normal acid, such as, $H_2SO_4$, and a normal salt, such as, $Cs_2SO_4$. In general, the chemical formula of the solid acids of the type used according to the present invention can be written as a combination of the salt and the acid, such as, $CsHSO_4$ ($0.5 Cs_2SO_4 \cdot 0.5H_2SO_4$), which was previously described in U.S. patent application Ser. No. 09/439,377 now U.S. Pat. No. 6,468,684, filed Nov. 15, 1999, the disclosure of which is incorporated herein by reference. Solid acids generally comprise oxyanions, such as, for example, $SO_4$, $SO_3$, $SeO_4$, $SeO_3$, $PO_4$, $PO_3F$, $PO_3H$ $AsO_4$, $SiF_6$ or $AlF_6$ etc., which are linked together via O—H . . . O hydrogen bonds. In addition, they contain cations for overall charge balance. The structure may contain more than one type of oxyanion $XO_4$, $XO_3$ $XO_3A$ or $XF_6$ group, and may also contain more than one type of cation M species. Under certain conditions of temperature and pressure, generally between about 50 and 100° C., the crystal structure of these solid acids becomes disordered. Concomitant with this disordered state, known as the superprotonic phase, is an increase of the conductivity of the solid acid, often by several orders of magnitude, to between about $10^{-3}$ to $10^{-2}$ $\Omega^{-1}$ $cm^{-1}$. Because of the structure of these solid acids, the proton transport mechanism does not rely on the motion of hydronium ions. As a result, solid acids do not need to be hydrated to function and can be operated at elevated temperatures to increase efficiency and reduce the potential for poisoning contamination of the catalyst medium in the electrochemical device.

Although several conventional superprotonic solid acid species are discussed above, these materials generally suffer from by hydrogen in the presence of typical fuel cell catalysts, such as, for example, the reduction of $CsHSO_4$ to $H_2S$ according to:

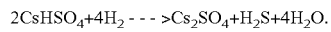

$2CsHSO_4 + 4H_2 \text{ - - - >} Cs_2SO_4 + H_2S + 4H_2O$.

A similar reduction reaction occurs for $CsHSeO_4$.

In addition, many solid acids are water soluble, such as $CsHSO_4$ and $CsHSeO_4$, and thus do not have long lifetimes in the presence of liquid water Accordingly, the current invention is directed to improved solid acid structures which do not suffer from reduction in the presence of catalytic materials such as Pt and other transition metal elements. Indeed, any solid acids having a tetrahedral or octahedral hydrogen bonding anion group; a superprotonic trigonal disorder phase; and/or being capable of operating at temperatures of ~100° C. in the presence of typical fuel cell catalysts may be utilized as an electrolyte material in the current invention.

For example, Applicants have discovered that by replacing the Sulfur (or Se) of superprotonic solid acids with elements such as Si and Ge the reduction reaction can be avoided because analogous reduction compounds such as $H_4Si$ and $H_4Ge$ are extremely unstable. Thus, for example, superprotonic acids such as $LaHSiO_4$, $BaH_2SiO_4$, and $SrH_2GeO_4$ etc. are preferably used in the devices and materials of the current invention.

In one exemplary embodiment, the invention is directed to a solid acid having a disordered trigonal phase and a tetrahedral anion. For example, it is well known that the compounds $Pb_3(PO_4)_2$ and $Rb_3H(SeO_4)_2$ are essentially isostructural at room temperature, with the exception of incorporated protons in the selenate compound. Upon heating, both undergo a transition to a disordered, trigonal phase. Because of the incorporation of protons into the selenate, this disorder is accompanied by an increase of protonic conductivity by several orders of magnitude.

Accordingly, in one exemplary embodiment of a solid acid electrolyte according to the invention having a trigonal disordered phase and a tetrahedral anion the solid acid electrolyte is chosen from the phosphate species of the general form: $(M_{1-x}M'_x)_3H_3(PO_4)_2$, where M is any alkaline earth or transition metal having a +2 charge, such as $Mg^{2+}$ . . . $Ba^{2+}$, $Pb^{2+}$; and M' is any alkali metal or other functional group having a +1 charge, such as, $Li^+$ . . . $Cs^+$, $NH_4^+$. ncorporation of protons into the phosphate compounds, by substitution of an alkali metal or ammonium ion onto the alkaline earth site, gives rise to a superprotonic high conductivity trigonal disordered phase. An exemplary intermediate alkali-alkaline earth acid phosphate, as formulated here, is $Na_2CaH_2(PO_4)_2$.

In a second exemplary embodiment of trigonal solid acids having tetrahedral anions according to the invention, protons are introduced into the trigonal compounds such as $Pb_3(PO_4)_2$ by substituting species such as $Si^{4+}$ and $Ge^{4+}$ for the $P^{5+}$. The reduction in positive charge can then be balanced by incorporated protons. For example, in such an embodiment, suitable solid acids can be chosen from the group described by the form: $M_3H_{2x}[(P_{1-x}Si_x)O_4]_2$ and $M_3H_{2x}[(P_{1-x}Ge_x)O_4]$ where M is any alkali or transition metal having a +2 charge, such as $Mg^{2+}$ . . . $Ba^{2+}$, $Pb^{2+}$.

In another embodiment directed to a solid acid electrolyte material having a tetrahedral anion, the tetrahedral anion group, $PO_3F$, is utilized. It is well-known that $PO_3F$, is isoelectronic with $SO_4$, and also shares chemical properties. For example, the compound $CsHPO_3F$ is known in the literature, and has a room temperature structure which shares some similarities to the superprotonic tetragonal structure of $CsHSO_4$. The proton content in monofluorophosphate solid acids can be increased by introducing phosphate anions according to the general chemical formula $MH_{1+x}(PO_3F)_{1-x}$ $(PO_4)_x$, which includes the simple compounds $MHPO_3F$, in analogy to known $MH_{1+x}(SO_4)_{1-x}(PO_4)_x$ compounds. The $PO_3F$ anion can be utilized to replace $SO_4$ not only in compounds of general stoichiometry $MHSO_4$, but also in those with stoichiometry $M_3H(SO_4)_2$. Accordingly, in yet another embodiment of a solid acid having a tetrahedral anion, the solid acid may be chosen from monofluorophosphate and mixed monofluorophosphate/phosphate species of the general form: $M_3H(PO_3F)_2$ and $M_3H_{1+2x}[(PO_3F)_{1-x}(PO_4)_x]_2$, where M is any alkali metal or other functional group having a +1 charge, such as, $Li^+$ . . . $Cs^+$, $NH_4^+$.

Still another type of tetrahedral group that can be considered a viable substitute for $SO_4$ (or $SeO_4$) is $PO_3H$. The chemical similarity between $SO_4$ and $PO_3H$, is somewhat less than that between $SO_4$ and $PO_3F$, because the P—H bond is quite distinct. Nevertheless, the room temperature structures are built on similar hydrogen bonded tetrahedral units. Several compounds in the $MH(PO_3H)$ family are known, including $CsH_2PO_3$, $KH_2PO_3$, $LiH_2PO_3$ and $NH_4H_2PO_3$. In comparison to compounds such as $CsH_2PO_4$, it is noteworthy that the oxidation state is +3 rather than +5, and thus the phosphites are unlikely to be susceptible to reduction during fuel cell operation. Accordingly, in yet another alternative embodiment the tetrahedral solid acid species may be chosen from mixed phosphite and phosphite/phosphate species of the general form: $MH(PO_3H)$, $M_3H(PO_3H)_2$, $MH_{1+x}(PO_3H)_{1-x}$ $(PO_4)_x$, and $M_3H_{1+2x}[(PO_3H)_{1-x}(PO_4)_x]_2$ where M is any alkali metal or other functional group having a +1 charge, such as, $Li^+$ . . . $Cs^+$, $NH_4^+$.

Figure 1B:
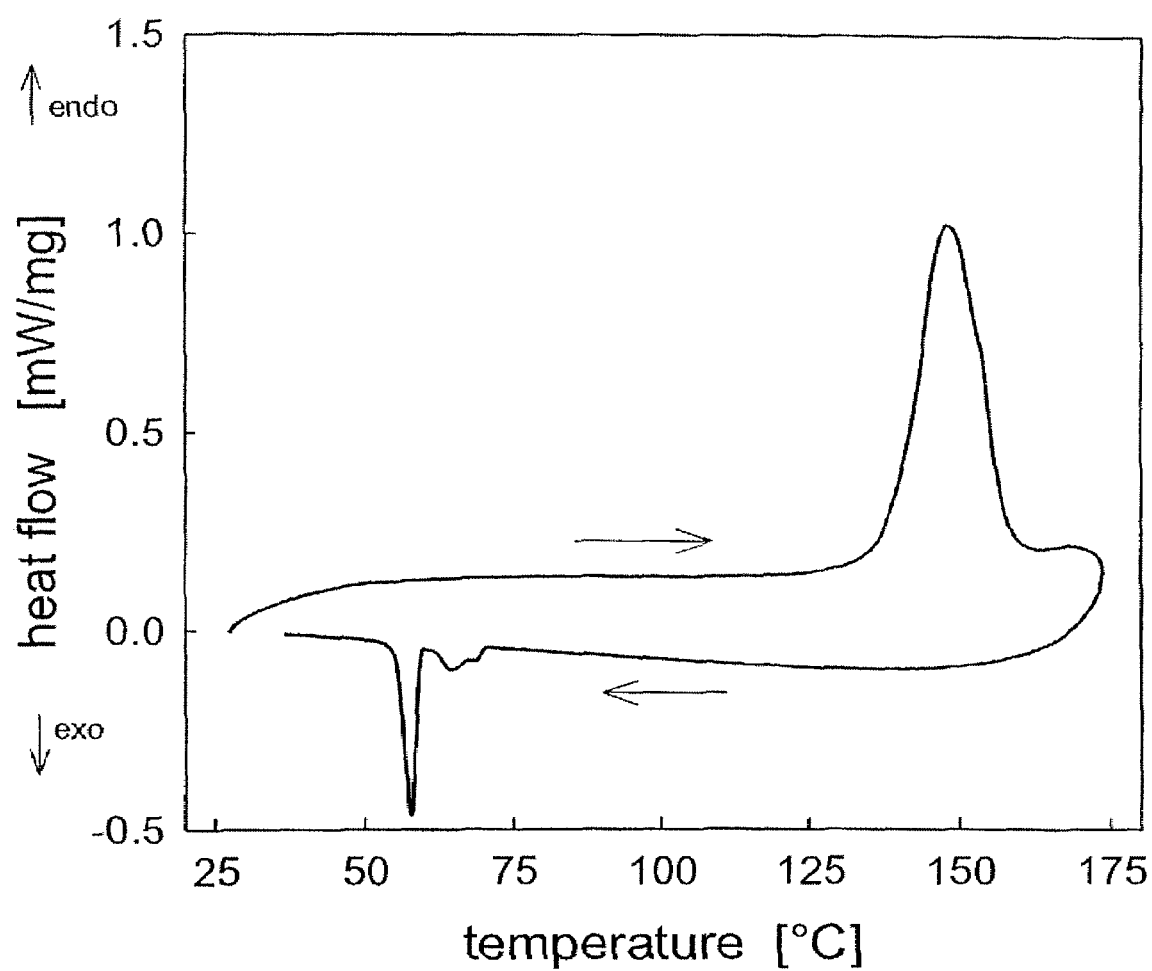
Figure 1C:
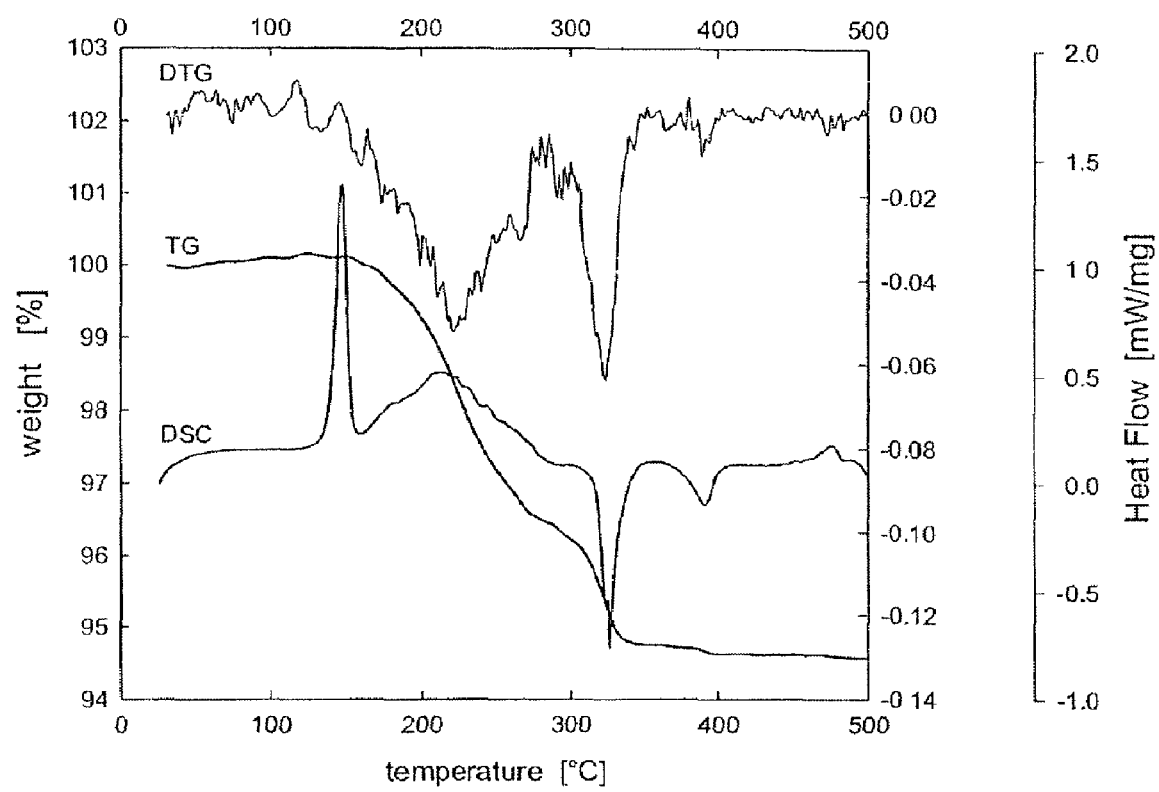
Figure 1D:
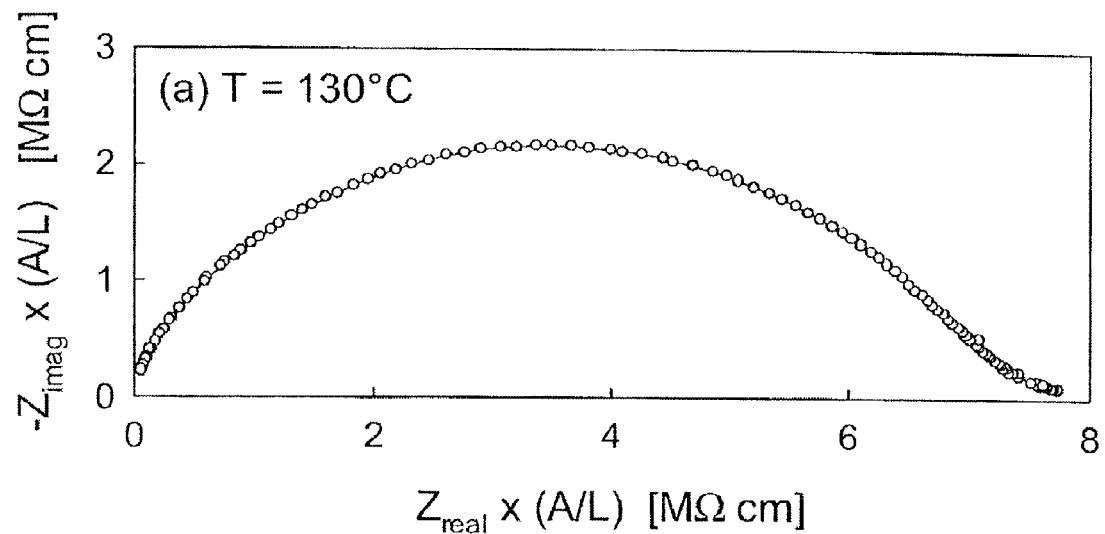
Figure 1E:
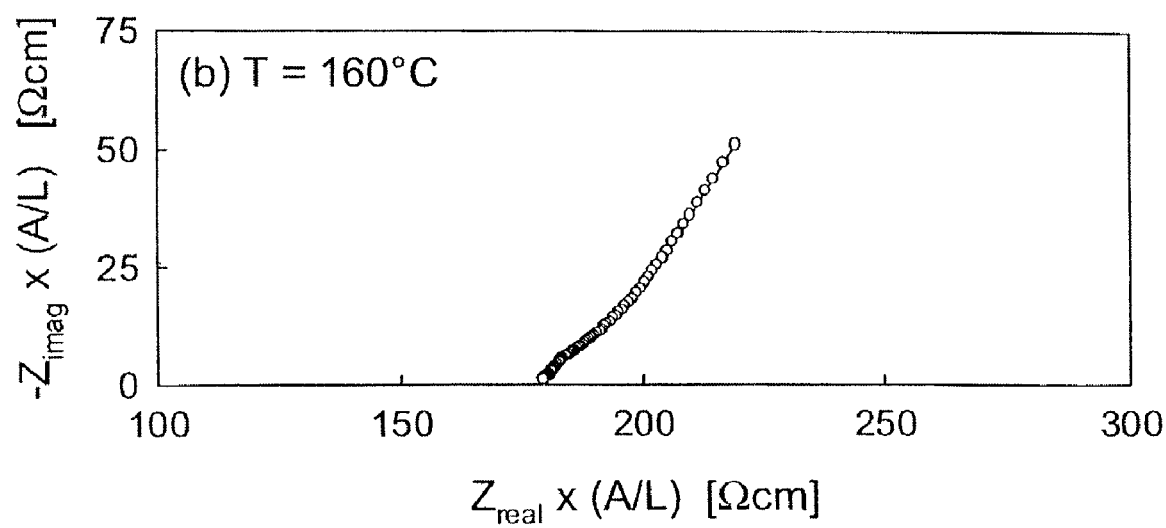

Moreover, the Applicants have discovered that solid acids in which the sulfate group is replaced with the phosphite will have similar structures, phase transitions and proton transport properties to $CsHSO_4$, but advantageously will not show the degradation from the production of $H_2S$. High temperature investigations of the compound $CsH(PO_3H)$ (or $CsH_2PO_3$, cesium hydrogen phosphite) revealed that this material undergoes a transition, with an onset of 137° C., to a phase of high proton conductivity. These results are summarized in FIGS. 1a to 1e, discussed below. The transition is accompanied by a large heat of transformation, $\Delta H=58\pm2$ J/g ($12.4\pm0.4$ kJ/mole), and exhibits measurable hysteresis, occurring at 96° C. upon cooling, as shown in FIGS. 1a to 1c. High temperature X-ray powder diffraction showed that the high temperature phase is cubic, with $a_o=4.896(1)$ Å, and likely takes on a CsCl structure, with Cs atoms at the corners of a simple cubic unit cell, and $PO_3H$ groups at the center. The conductivity in the high temperature phase at 160° C. is $5.5\times10^{-3}$ $\Omega^{-1}$ cm$^{-1}$, and the activation energy for proton transport is $0.40\pm0.01$ eV, as shown by comparison in FIGS. 1d and 1e. These values suggest that proton transport is facilitated by rapid $PO_3H$ group reorientations in the cubic phase of $CsH(PO_3H)$, as is known to occur in the high temperature, tetragonal phase of $CsHSO_4$.

Still another type of solid acid electrolyte material having a tetrahedral anion is formed by $K_2CrO_4$ demonstrating the interchangeable nature of sulfates and chromates. Chromates have also been shown to exhibit the same tetrahedral disorder at elevated temperatures that sulfates do, and therefore, the tetrahedral solid acid species may also be chosen from the mixed chromate species of the general form: $MH_{1+x}(CrO_4)_{1-x}(PO_4)_x$, where M is any alkaline metal or other functional group having a +1 charge, such as, Li$^+$ ... Cs$^+$, NH$_4^+$. Mixed sulfate/phosphate compounds have been synthesized with superprotonic phase transitions temperatures lower than the compound end members. For example, in $Cs_2HSO_4H_2PO_4$ the superprotonic phase transition is at 90° C., as compared to $CsHSO_4$ at 141° C. and $CsH_2PO_4$ at 230° C. The lowered phase transition temperature in the analogous chromate/phosphates compound helps prevent problematic dehydration of the phosphate above the superprotonic phase transition temperature, and by replacing sulfate with chromate, reduction of the sulfate to $H_2S$ in a fuel cell environment is avoided.

In another alternative embodiment, the invention is directed to solid acid electrolyte compounds that contain an octahedral polyanion. In this class, materials such as $KPF_6$ form structures in which disorder is sustained at slightly elevated temperature. However, such materials contain no protons. By replacing the $PF_6$ polyanion with $SiF_6$ or $GeF_6$, protons can be introduced for charge balance reasons. It is also noteworthy that unlike their sulfate and phosphate cousins, these salts and acids are insoluble in water. Accordingly, the solid acid may be chosen from fluorosilicates and germanates of the general form: $MHSiF_6$ and $MHGeF_6$, where M is any alkaline metal or other functional group having a +1 charge, such as, Li$^+$ ... Cs$^+$, NH$_4$.

Alternatively, the known structural transition in compounds such as $KPF_6$ to a disordered state can be taken advantage of for proton transport by partial (rather than complete) chemical substitution of the $PF_6$ anion by $SiF_6$ or $GeF_6$. Because proton incorporation accompanies the substitution, high conductivity in the high-temperature disordered phase can be obtained. +. Accordingly, in this alternative embodiment of the solid acid, the solid acid electrolyte material may be chosen from mixed phosphosilicates and phosphogermanates of the general form: $MH_x(P_{1-x}Si_x)F_6$ and $MH_x(P_{1-x}Ge_x)F_6$, where M is any alkaline metal or other functional group having a +1 charge, such as, Li$^+$ .... Cs$^+$, NH$_4^+$.

In still another embodiment, the solid acid may have an octahedral anion group according to: $AlF_6$. Exemplary embodiments of such compounds would be $MH_2AlF_6$ and $M_2HAlF_6$, where M is any alkaline metal or other functional group having a +1 charge, such as, Li$^+$ ... Cs$^+$, NH$_4^+$; or M'HAlF$_6$, where M' is +2, where M' is any alkali or transition metal having a +2 charge, such as Mg$^{2+}$ ... Ba$^{2+}$, Pb$^{2+}$. Other embodiments would also include mixtures of the above species with MHSiF$_6$, MHGeF$_6$ and MPF$_6$ The preferred material for any specific electrochemical device depends on the application. For example, the preferred species may depend on the needs of a device, such as, high conductivity, low cost, thermal stability or chemical stability, etc.

Although the conductivity of the above-recited solid acids is described as purely protonic, these solid acid electrolytes can be made to conduct both electrons and protons depending on the choice of the M cation and the X element in the anion $XO_4$, $XO_3$ or $XF_6$ portion of the above chemical formulae. For example, by using a given amount of a variable valence element, such as Pb or In for M, or a transition metal element, such as, for example, Cr or Mn for X, the solid acid can be made to conduct electrons as well as protons.

The invention is also directed to methods of forming the superprotonic solid acid electrolyte materials described above. The synthesis of the stable, high-conductivity solid acid compounds derives from the Applicants' recognition that degradation of conventional solid acid materials, such as $CsHSO_4$ occurs via the reduction of sulfur under hydrogen to yield $H_2S$. This reduction reaction is normally slow, even at fuel cell operation temperatures of ~100° C., however, it is highly accelerated in the presence of typical fuel cell catalysts.

However, Applicants have discovered that such reduction reactions can be eliminated by replacing the S (or Se) of conventional superprotonic solid acids with elements such as Si and Ge, as $H_4Si$ and $H_4Ge$ are extremely unstable and unlikely to form. Thus, target analogies to $CsHSO_4$ and $CsH_2PO_4$ are, for example, $LaHSiO_4$ and $BaH_2SiO_4$, etc.

An additional benefit of such compounds, in cases where alkaline earth or rare earth metals are incorporated rather than alkali metals, is that the resultant compound is water insoluble. In cases where alkali metals are utilized, new stoichiometries such as $Cs_2H_2SiO_4$ can be probed.

However, in general, acid silicates and germanates are more difficult to synthesis than the analogous sulfates and phosphates both because of the insolubility of the former group of compounds in water, and because of their tendency to form polymerized structures (with Si—O—Si or Ge—O—Ge linkages) rather than crystallizing with isolated $XO_4$ groups.

Accordingly, in a first exemplary embodiment, one method of synthesizing such solid acid electrolyte materials begins with the synthesis of known acid silicates and germanates. Most such compounds contain small alkali or alkaline earth ions. In order to prepare crystalline compounds incorporating large cations (which are necessary for high proton conductivity) the same synthesis procedures are followed with the exception that one or more of the reactant materials is changed, for example, replacing NaOH with CsOH to yield a cesium acid silicate or germanate.

In a second exemplary approach to large cation silicates and germanates an ion exchange reaction is carried out on known compounds. That is, Na can be replaced in a known acid silicate with Cs by soaking the original material in molten CsOH.

In a third exemplary approach compounds containing Li rather than H are formed, and then an ion exchange reaction is carried out in an acid media. For example, the compound LaLiSiO$_4$ is known, the lithium can be replaced with protons using an acid that will not dissolve the base material.

EXAMPLES

Several exemplary chemically stable superprotonic solid acids have been synthesized according to the above methods including: $NaCaHSiO_4$, $BaH_2SiO_4$, $SrH_2GeO_4$ and $Na_2H_2SiO_4 \cdot xH_2O$. Synthesis methods employed for each are as follows:

Example 1

$CsH(PO_3H)$: The compound $CsH(PO_3H)$ was synthesized from aqueous solutions of cesium carbonate and phosphorous acid in which the $Cs:PO_3H$ mole ratio was fixed at 1:1. Just enough water was added to ensure complete dissolution, and then the solution gently heated to induce $H_2O$ evaporation and precipitation of the product. The resultant material was separated from the mother liquor by filtering and rinsed with acetone.

Example 2

$NaCaHSiO_4$: combine NaOH, $Ca(OH)2$ and $SiO_2$ (in a 3:2:2 molar ratio) with a few drops of water and place in a thermal bomb at 280° C. for 48 hours. (B. G. Cooksley and H. F. W. Tayer, *Acta. Cryst.* B30 (1974) 864-867.)

Example 3

$BaH_2SiO_4$: dissolve NaOH and $Na2SiO_3$ in hot deionized water and then add aqueous $BaCl_2$ (mole ratio of Ba:Si=1.2:1) to induce precipitation of the desired product. (G. Kruger and W. Wieker, *Z. Anorg. Allg. Chem.* 340 (1965) 227-293.)

Example 4

$SrH_2GeO_4$: combine $Sr(OH)_2$ and $GeO_2$ (in a 1:1 molar ratio) and place in a thermal bomb at 280° C. for several days; or, mix $Sr(OH)_2$ and $GeO_2$ (in a 1:1 molar ratio) in hot water to induce formation of the desired product. (H. Nowotny and G. Szekely, *Monat. Chem. Ver. Teile Wissenshft.* 161 (1952) 568-582.)

Example 5

$Na_2H_2SiO_4 \cdot 5H2O$: dissolve NaOH and $Na_2SiO_3$ in hot deionized water (mole ratio of Na:Si=4.65:1) and slowly evaporate excess water to induce crystal growth of the desired product. (P. B. Jamieson and L. S. Dent Glasser, *Acta Cryst.* 20 (1966) 373-376.)

Diffraction patterns of the resultant materials were then used to confirm that the desired products were obtained, although it should be understood that in some cases minor amounts of impurity phases will be present. The thermal behavior of the two exemplary dihydrogen silicates according to the invention, $BaH_2SiO_4$ and $Na_2H_2SiO_4 \cdot 5H2O$ has been investigated, and these compounds have been shown to be stable to ~320° C. (decomposition) and 70° C. (melting), respectively. (G. Kruger and W. Wieker, *Z. Anorg. Allg. Chem.* 340 (1965) 227-293; J. Flesche, B. Ketterer and R. L. Schmid, *Thermochim. Acta* 77 (1984) 109-121). The remaining two compounds, $NaCaHSiO_4$ and $SrH_2GeO_4$ were characterized by the Applicants by thermal methods (thermogravimetry and calorimetry) and all four compounds were examined by impedance spectroscopy to evaluate their suitability as fuel cell electrolytes. In the case of the sodium calcium acid silicate, H/D ion exchange and subsequent conductivity measurements were additionally performed to establish the nature of the charge-carrying species.

Figure 2:
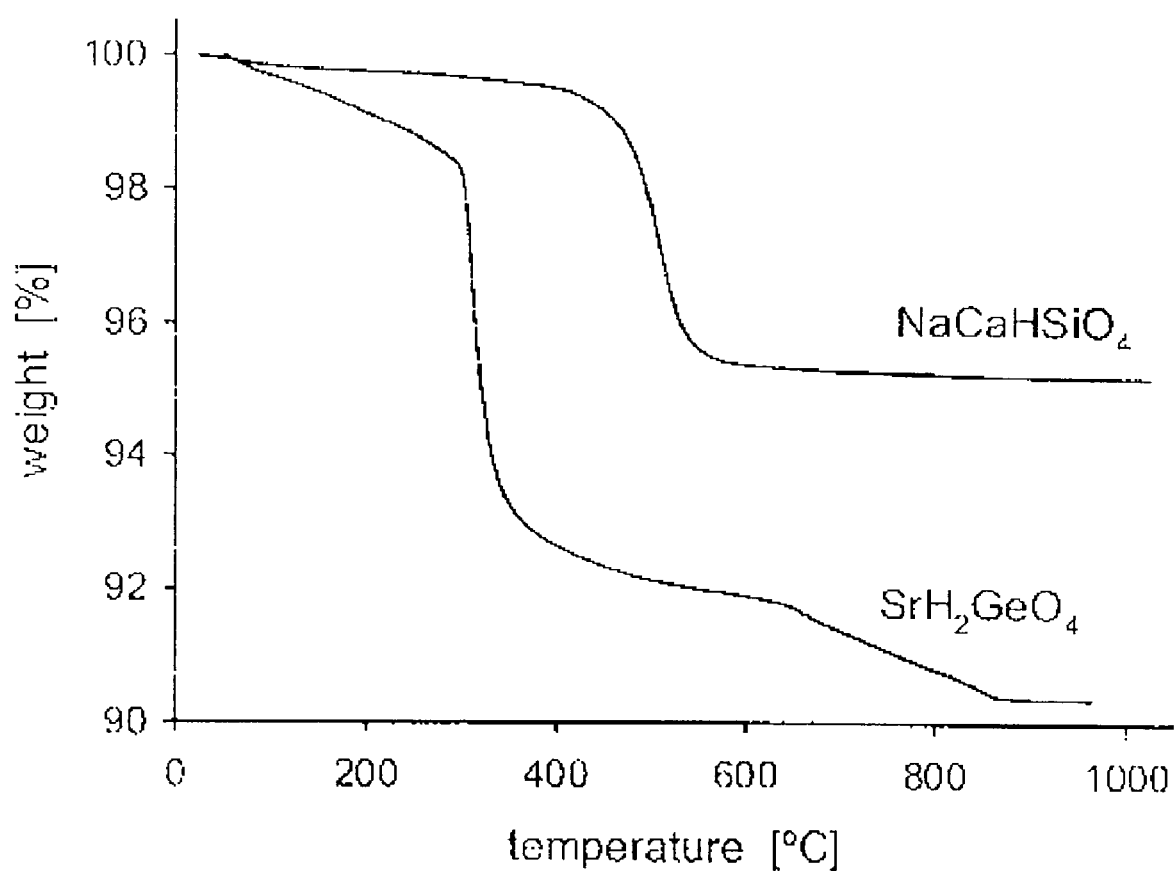
FIG. 2 shows a graphical representation of the temperature decomposition properties of exemplary solid acid electrolytes under nitrogen according to the current invention.

The results in FIG. 2, show thermal gravimetric curves of $NaCaHSiO_4$ and $SrH_2GeO_4$, and show that the silicate compound undergoes a gradual weight loss from room temperature to 460° C. of ~1%, then a rapid decomposition, giving rise to an additional 3.5% weight loss by 560° C., with a maximum in the weight loss rate at 505° C. The overall weight change corresponds to 0.42 moles $H_2O$ (per mole NaCaHSiO), which is close to the expected value of 0.5 moles. In contrast, $SrH_2GeO_4$ undergoes a rapid weight loss centered at 315° C., which begins at 295° C. and is essentially complete by 335° C. The total weight change of 9.6% corresponds to 1.2 moles of $H_2O$ (per mole $SrH_2GeO_4$). That this value is greater than the expected value of 8.0% (1 mole $H_2O/SrH_2GeO_4$) suggests that the initial weight loss over the temperature range 70-295° C. of 1.6 wt % corresponds to the loss of surface water. These results show that the $NaCaHSiO_4$ and $SrH_2GeO_4$ compounds exhibit relatively good thermal stability to ~400° C. and 280° C., respectively.

Calorimetric measurements (results not shown) indicated that none of these compounds undergoes a structural phase transition. That is, no sharp transitions to a superprotonic phase were observed. Rather broad thermal events corresponding to dehydration as established from the gravimetric measurements, were obtained.

Figure 3:
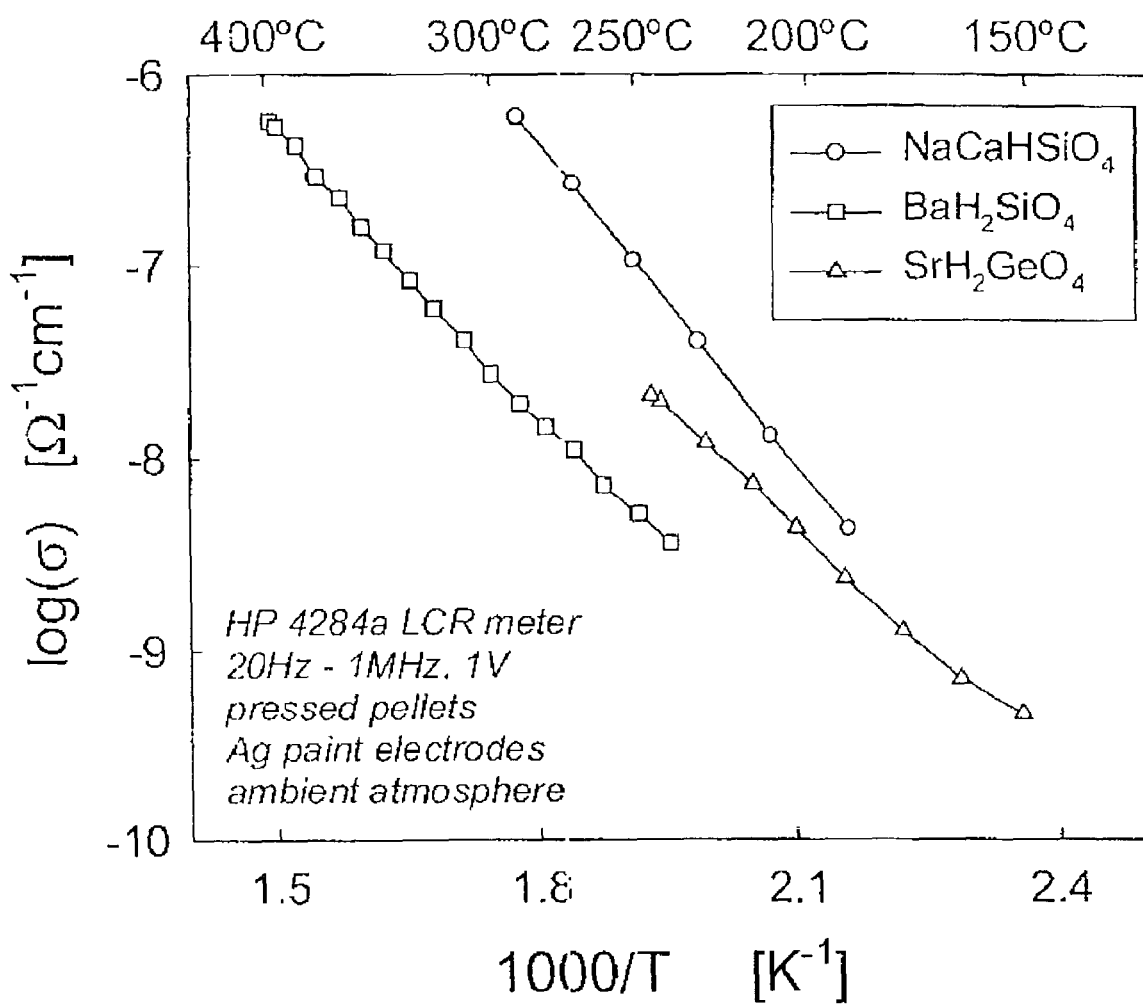
FIG. 3 shows a graphical representation of the conductivity properties of exemplary solid acid electrolytes under air according to the present invention.

The conductivities of the compounds in Examples 1 to 3 are shown in FIG. 3. As shown, the sodium silicate could only be measured over a limited temperature range, but exhibits the highest conductivity of the four compounds at close to ambient temperatures, $1.3 \times 10^{-6}$ $\Omega^{-1}$ $cm^{-1}$ at 50° C.

Figure 4:
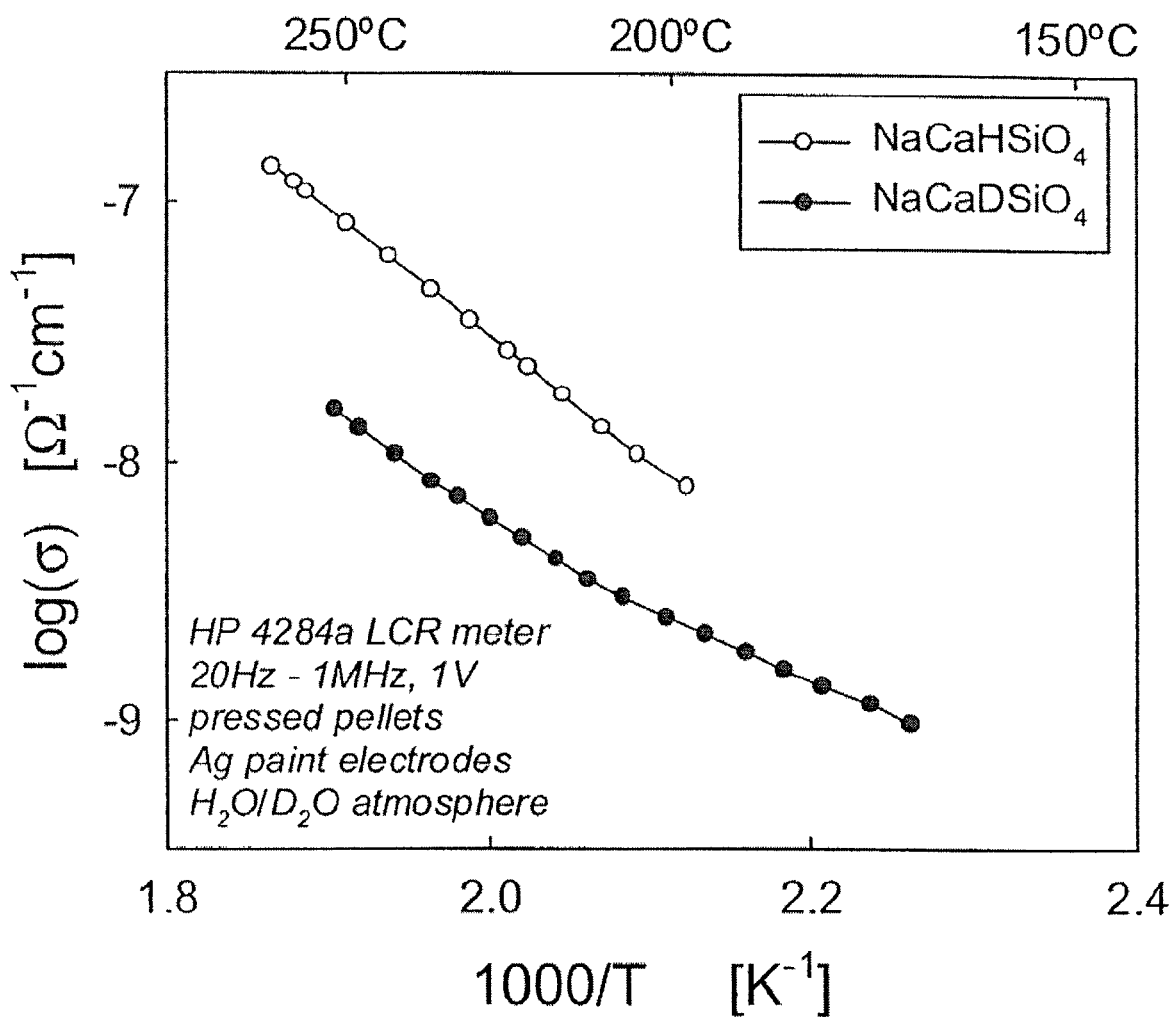
FIG. 4 shows a graphical representation of the conductivity properties of exemplary solid acid electrolytes according to the present invention.

In the case of the $NaCaHSiO_4$ compound, the possibility that charge transport occurs, at least in part, by the motion of sodium ions cannot be a priori ruled out. A comparison of the conductivities of the as-synthesized material and the deuterated analog exposed to hot $D_2O$ for several hours) shows the deuterated material to be a much poorer conductor, as shown in FIG. 4, signifying that protons/deuterons are indeed the mobile species. Indeed, the one order of magnitude difference in the two conductivities, which is greater than what can be easily explained changes in either jump frequency or zero point energies, rules out the possibility of measurable alkali ion contributions to the conductivity. In addition, examination of the material post-deuteration by X-ray powder diffraction confirmed that structural changes had not taken place.

Figure 5:
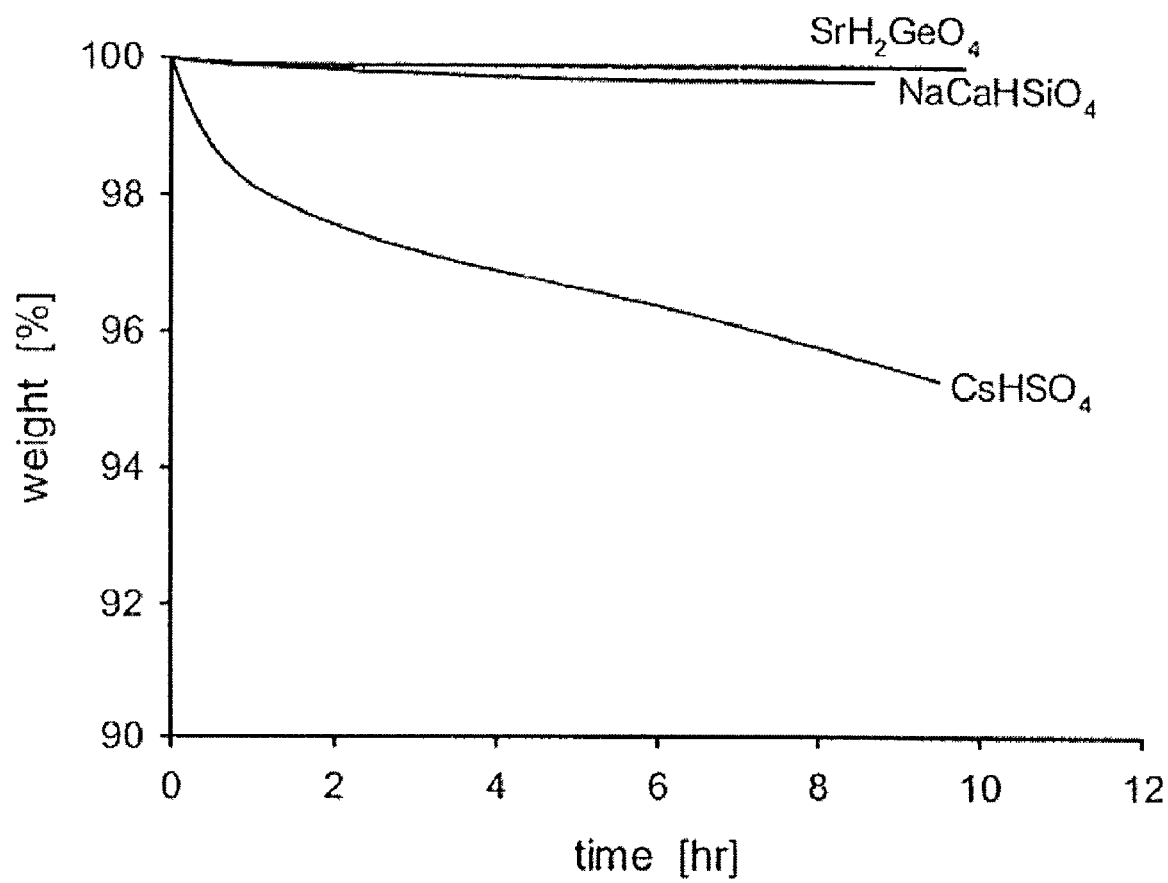
FIG. 5 shows a graphical comparison of the decomposition properties of conventional ($CsHSO_4$) and exemplary solid acid electrolytes under hydrogen according to the present invention.
Figure 6:
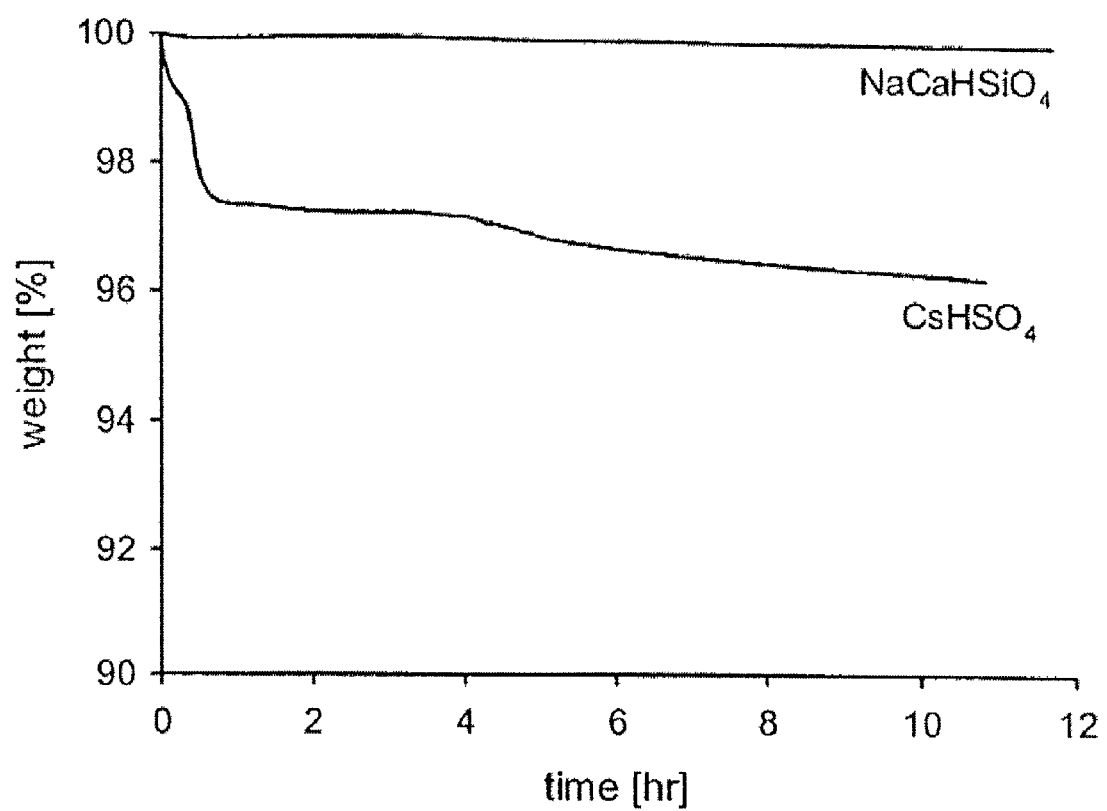
FIG. 6 shows a graphical comparison of the decomposition properties of conventional ($CsHSO_4$) and exemplary solid acid electrolytes under vapor phase methanol according to the present invention.

More significant than the conductivity is the stability of these silicates and germanates. As shown in FIG. 5, the thermal gravimetric behavior of $NaCaHSiO_4$, $SrH_2GeO_4$, and $CsHSO_4$ under flowing hydrogen gas and in the presence of a Pt catalyst material are compared. It is immediately evident that while the sulfate undergoes a dramatic weight loss under these conditions, both the silicate and germanate are quite stable. Similar results under methanol vapor (in the presence of Pt—Ru catalyst) were obtained, with $NaCaHSiO_4$ exhibiting good stability and $CsHSO_4$ exhibiting immediate weight loss, as shown in FIG. 6.

Figure 7:
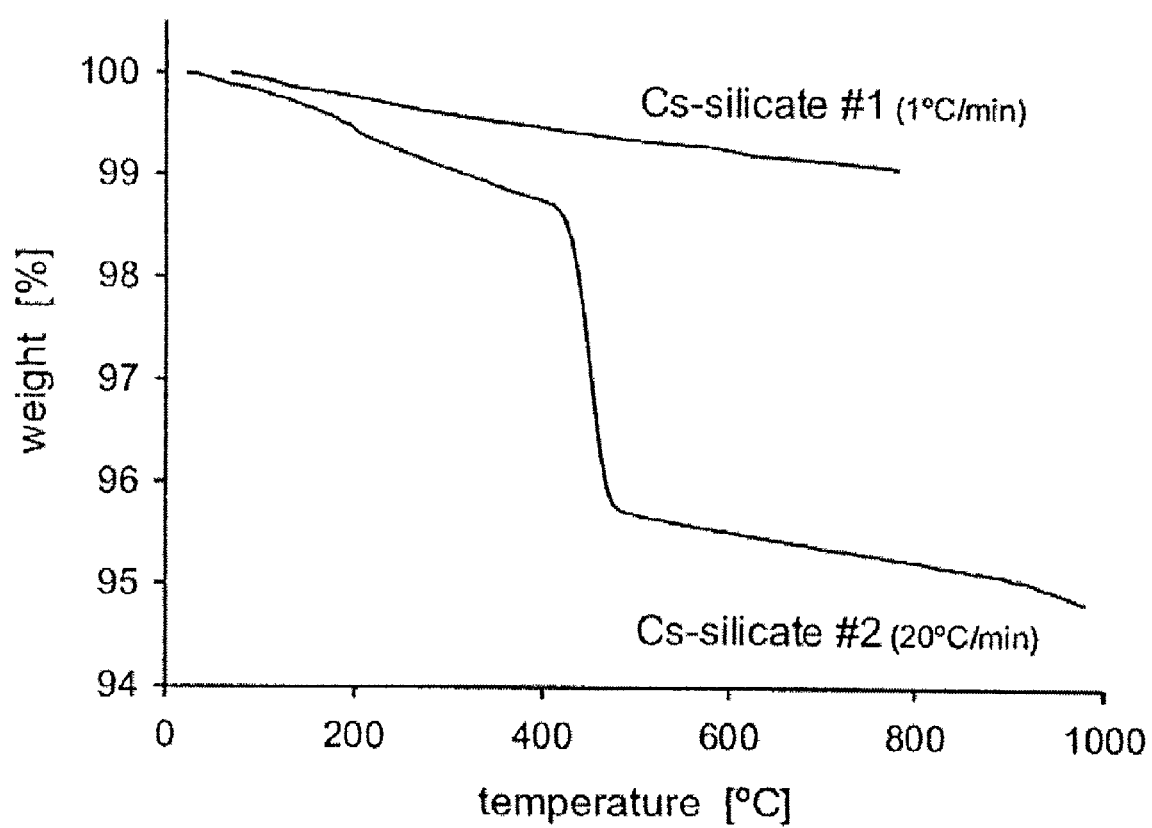
FIG. 7 shows a graphical representation of the temperature decomposition properties of exemplary solid acid electrolytes under nitrogen synthesized according to the current invention.

The greatest success of the direct synthesis route has been in the preparation of new single alkali silicates, in particular those containing cesium. The reaction of CsOH with $SiO_2$ (4:1 molar ratio) at 900° C. yielded a highly crystalline product, but one which likely did not contain acid protons. Reaction of these two starting materials (2:1 molar ratio) in a thermal bomb at 280° C. also yielded a highly crystalline product. This second product, however, has a markedly different diffraction pattern than the first, and the synthesis conditions suggest that the material contains acid protons. The thermal gravimetric curves of these two materials, cesium silicate #1 and cesium silicate #2, are shown in FIG. 7.

The first material is thermally stable to 800° C. (with the exception of a small weight loss due to the desorption of surface water adsorbed post-synthesis), which is consistent with the absence of acid protons. The second material is thermally stable to only ~400° C., consistent with the presence of acid protons.

Figure 8:
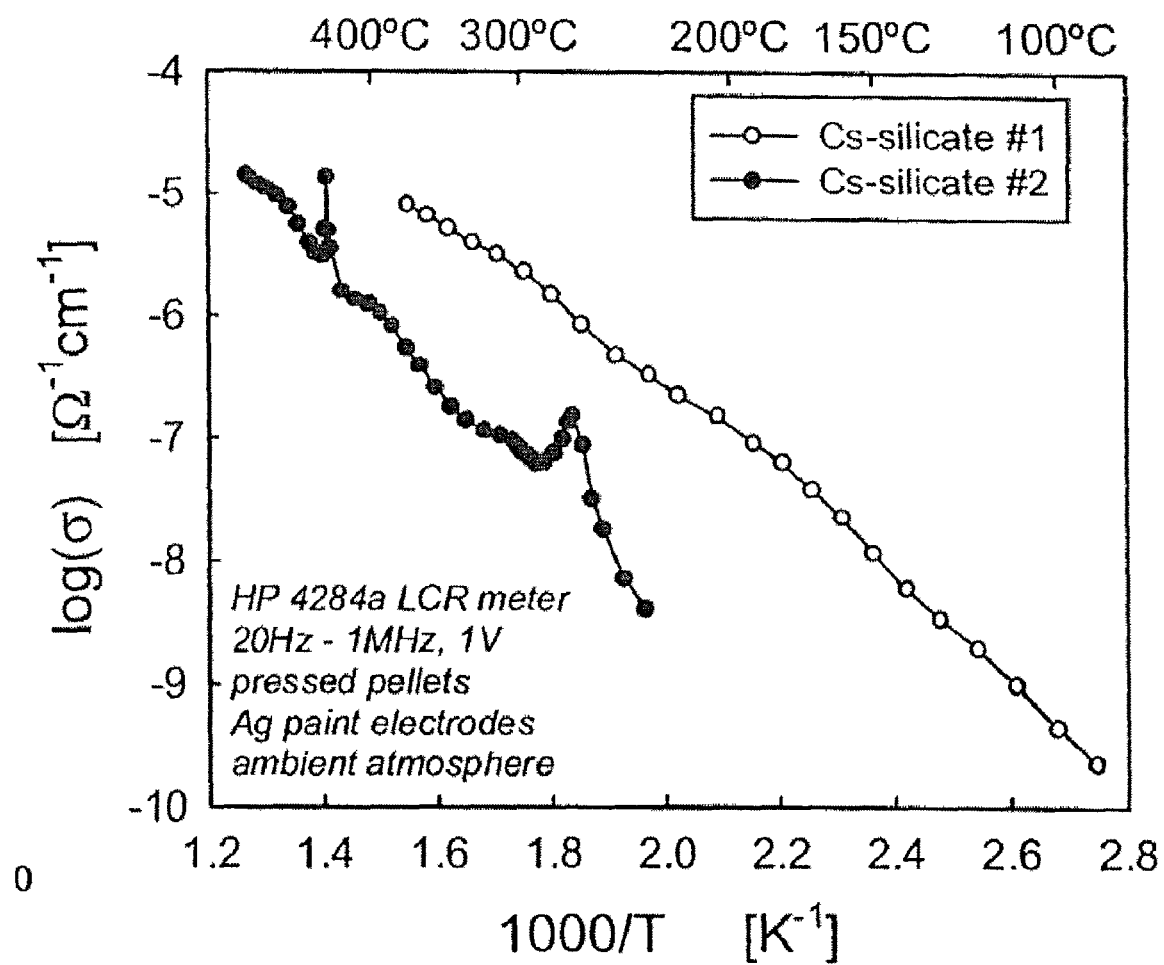
FIG. 8 shows a graphical representation of the conductivity properties of exemplary solid acid electrolytes synthesized according to the current invention.

Although the conductivities of these materials, as shown in FIG. 8, are not as high as the acid sulfates, the increased stability of the materials and the relatively high conductivity shows great potential as an electrolyte material.

Likewise, synthesis of new acid silicates by ion exchange of the alkali species in $NaCaHSiO_4$ yielded results which are summarized in Table 1, below, along with the appropriate reaction conditions.

Figure 10:
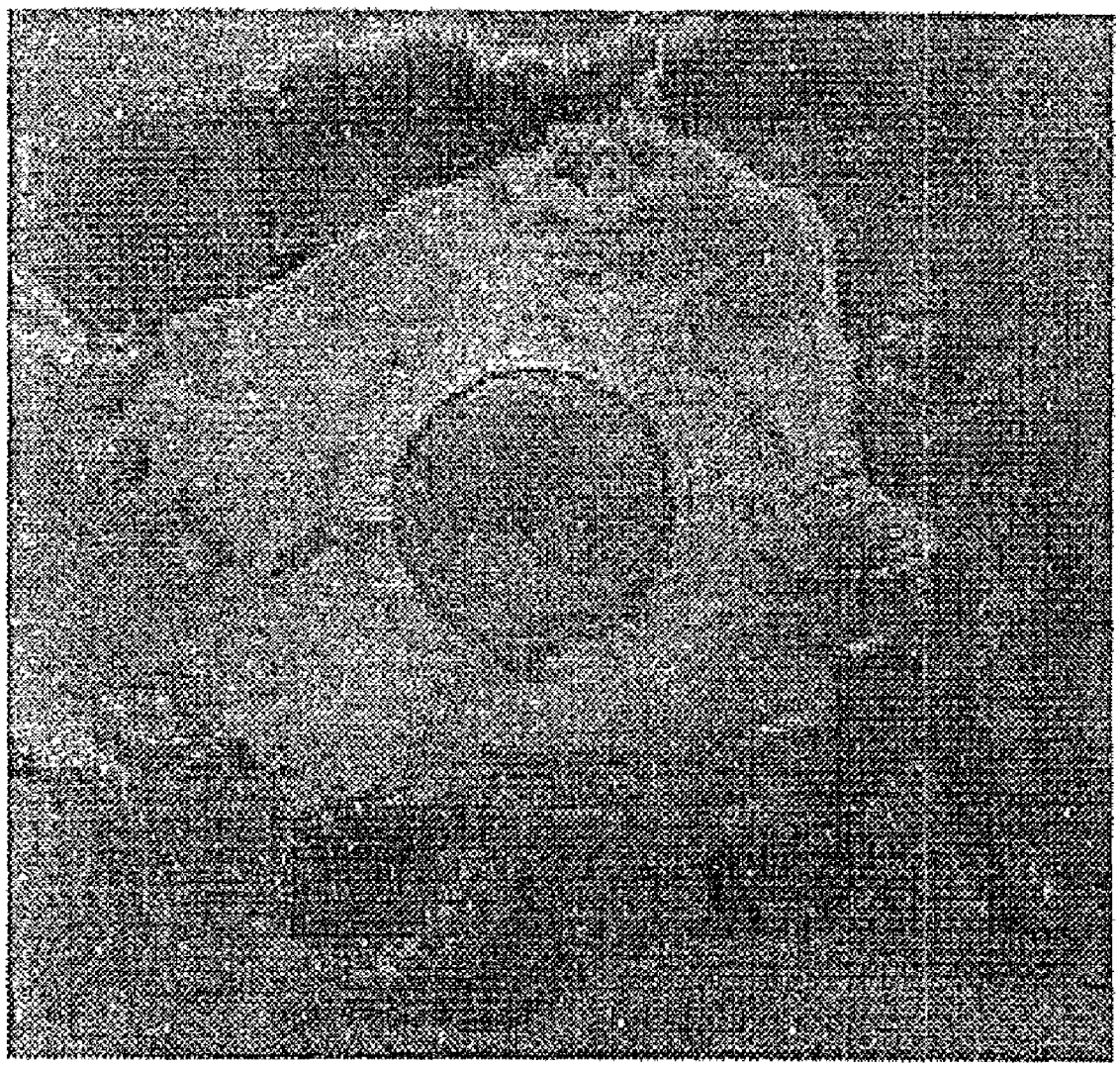
FIGS. 10a and 10b show a pictorial reproduction of exemplary membranes made of exemplary solid acid electrolytes according to the current invention.
Figure 10:
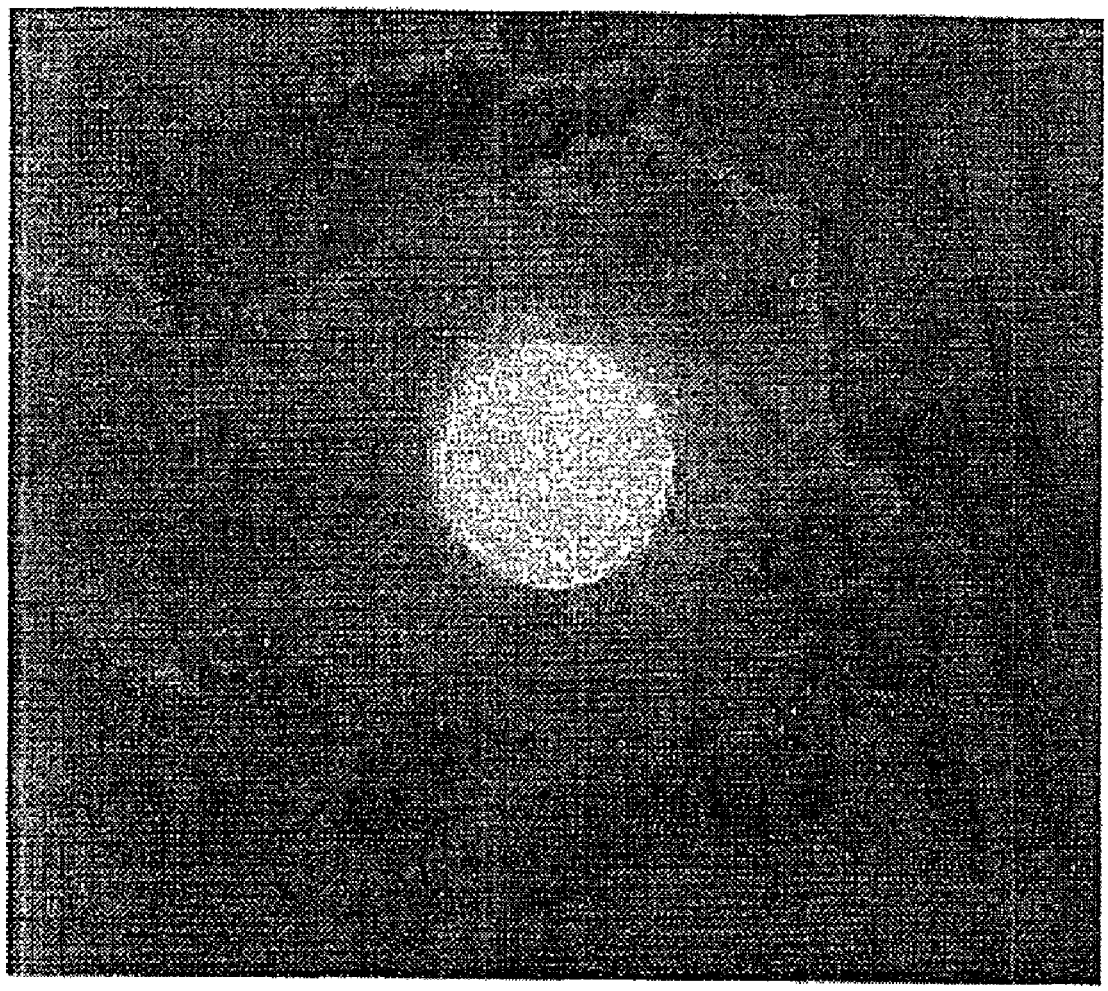

~190° C. yield transparent membranes of $CsHSO_4$, as shown in FIGS. 10a and 10b. Specifically, FIG. 10a shows the image of hot pressed $CsHSO_4$ with a sample thickness of 320 μm mounted in copper plate under reflected light, and FIG. 10b shows the material with light shining from behind emphasizing translucency.

Although the above discussion has focussed on processing pure solid acid electrolyte materials, because of the mechanical difficulties described above, in one embodiment of the invention the solid acid electrolyte materials are processed as a composite in which the solid acid is embedded in a supporting matrix. In such a composite, the solid acid is in its superportonic state, exhibits high conductivity, and provides the desired electrochemical properties, whereas the support matrix provides mechanical support, and it may also serve to protect the solid acid from water in the environment. In such

TABLE 1

Ion Exchange Experiments

| Solvent | Temp, ° C. | Crucible/Bomb | Time | Product | Sample # | Δσ* |
|---|---|---|---|---|---|---|
| 4 M CsOH | 220 | Teflon bomb | 19 days | amorphous | IonEx-1 | ↓ |
| CsOH | 200 | $Al_2O_3$ crucible | 16 hrs | small change | IonEx-2 | n/a |
| CsOH | 300 | $Al_2O_3$ crucible | 2 hrs | amorphous | IonEx-3 | ↑ |
| $RbC_2H_3O_2$ | 270 | $Al_2O_3$ crucible | 14 hrs | negligible change | IonEx-4 | n/a |
| $KC_2H_3O_2$ | 340 | $Al_2O_3$ crucible | 20 hrs | small change | IonEx-5 | ↑↑ |
| $KC_2H_3O_2$ | 305 | $Al_2O_3$ crucible | 2 hrs | negligible change | IonEx-6 | n/a |
| $KH_2PO_4$ | 290 | $Al_2O_3$ crucible | 4 hrs | new phase | IonEx-7 | ↓ |
| 4 M KOH | 280 | Teflon bomb | 13 days | new phase | IonEx-8 | ↓ |
| KOH | 400 | $Al_2O_3$ crucible | 4 hrs | amorphous | IonEx-9 | n/a |

*change in conductivity

Figure 9:
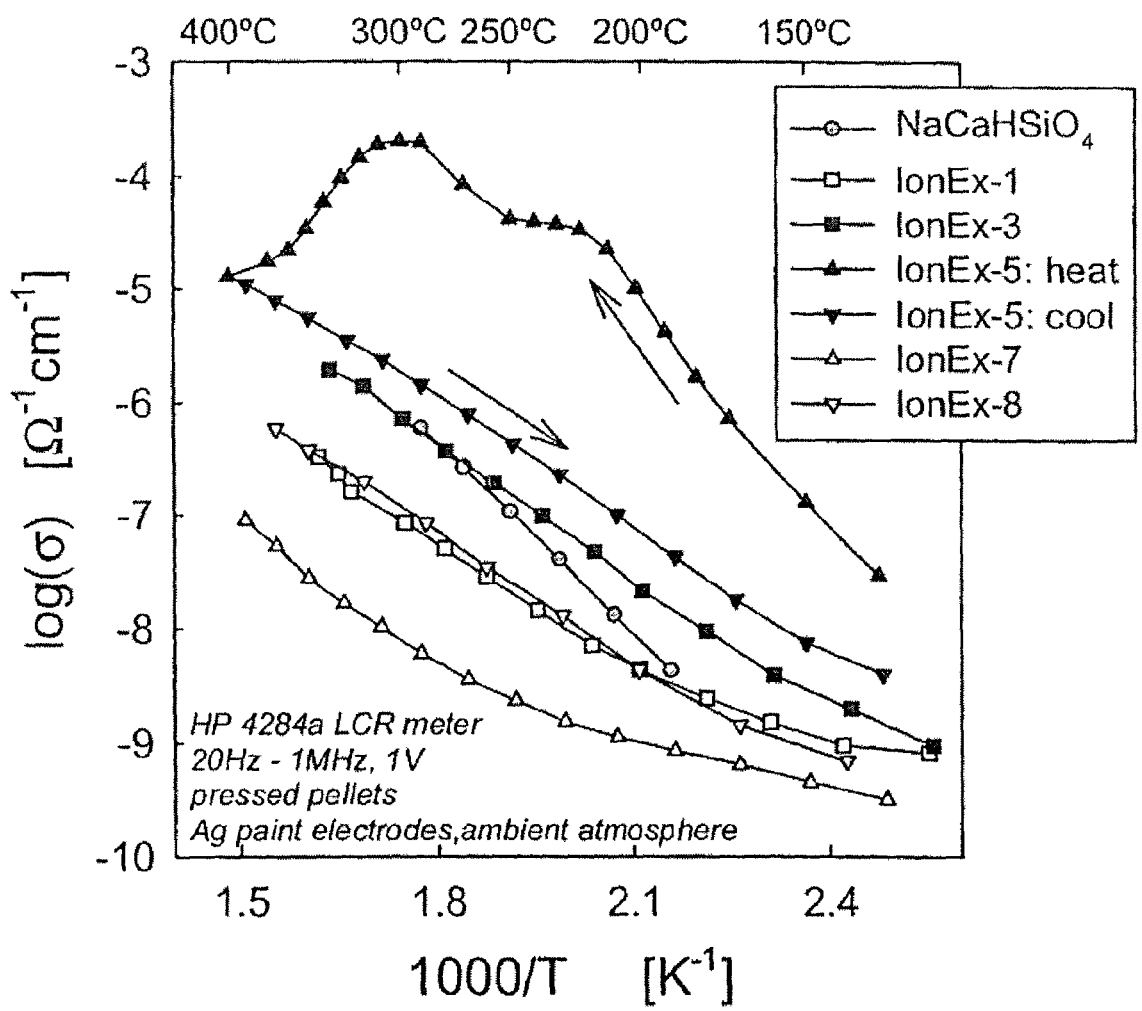
FIG. 9 shows a graphical representation of the conductivity properties of exemplary solid acid electrolytes synthesized according to the current invention.

As shown in FIG. 9, whereas in some cases the ion exchange process produced little effect on the $NaCaHSiO_4$, in others it resulted in the crystallization of completely new phases. In general, the change in conductivity induced by the ion exchange was less than an order of magnitude. However, it should be noted that exposure of $NaCaHSiO4$ to molten potassium acetate (IonEx-5) results in an increase in conductivity of two orders of magnitude, without inducing significant changes to the crystal structure.

The final route for the preparation of new alkali acid silicates and germanates, that involving proton exchange from Li containing compounds, is described with reference to the compounds $Li_4SiO_4$ and $LaLiSiO_4$, which have been successfully synthesized, both by solid state reaction following the procedures outlined by Pfeiffer (*J. Nucl. Mat.* 257 (1998) 309-317) and Sato et al. (*Solid State Ionics* 83 (1996) 249-256), respectively. The synthesis of these and other compounds indicate that direct synthesis of acid silicates requires more extreme hydrothermal conditions, i.e., higher pressures and temperatures. However, the ion exchange methods (which have led to an increase in the conductivity of NaCaH-SiO4 by two orders of magnitude) show excellent results.

Although the above discussion has focussed on the solid acid electrolyte materials in their raw form, it should be understood that for integration into electrochemical devices the solid acid electrolyte materials of the current invention are preferably formed into membranes (MEAs). Accordingly, this invention is also directed to methods of fabricating membranes from the solid acid electrolyte materials described herein.

Fabrication of thin, high density solid acid membranes generally entails the simultaneous application of high temperatures and pressures (uniaxial). Applicants have found that application of pressures of ~700 psi and temperatures of an embodiment any suitable matrix material may be utilized which would provide sufficient mechanical and/or chemical support, such as, for example, a polymer, a ceramic, or an oxide glass.

Accordingly, in one embodiment composite membrane of solid acids according to the invention and a simple structural polymer, such as polyvinylidene fluoride may be prepared by simple melt-processing, where the two components are lightly ground together and then hot-pressed at 180° C. and 10 kpsi for 15 minutes. The greatest difficulty often encountered with this method is in removing the electrolyte from the hot press without introducing cracks, and the method has a limitation that the thinnest membranes that can be fabricated by the method of hot-pressing is ~200 μm. For non-polymeric matrix materials, the mixture of the two components is then hot pressed, preferably at a temperature which causes the solid acid to melt and flow, to yield a dense composite membrane.

In another example, the invention is directed to a method of forming thinner electrolytes in a stabilizing matrix. In one such embodiment, the membrane may be formed by providing a thermoset polymer in a monomer or prepolymer form and then polymerizing the polymer in situ with the solid acid. In this method, the two materials are again ground together and the polymerization/crosslinking catalyst agent is added. Any suitable prepolymer may be used, such as, for example, polyester resins. In one exemplary embodiment a solid acid was ground and mixed with the prepolymer. The polymerization catalyst was introduced and the mixture then poured onto a plate and pressed into a thin film. The film thus produced was then cured at 100° C. for approximately 2 hours.

In still another exemplary embodiment, the membrane may be formed by suspension casting. In this embodiment, the solid acid and matrix material are dissolved and/or dispersed in an appropriate solvent system, such as a water/ethanol solution. The membrane is then formed by casting the suspension and allowing the solvents to evaporate. In addition to polymers, membranes containing non-polymeric matrix materials, such as ceramic or oxide glass, can be formed by this method.

According to the above discussion, the solid acid is mixed with a supporting structure that is electrochemically unreactive, to form a composite material. Because, the solid acids of the current invention, without judicious selection of the M and X species, are inherently poor conductors of electrons, these materials alone may only be utilized to provide proton transport. However, in one embodiment of the invention the matrix material has conducting properties such that the composite membrane provides both electron and proton transport.

In a first embodiment, electronic conductivity is introduced into the solid acid by preparing a composite, via any of the above methods, comprised of the solid acid and a second substance which has a high electronic conductivity. This second substance may any suitable electronically conducting material, such as, for example, a conducting polymer, such as polyaniline; or a typical metal, such as copper; or graphite. In cases where the electronically conducting material is a metal, it may be further advantageous to provide a flexible and inert material, such as a polymer, into the composite to serve as a binder.

In a second embodiment, electronic conductivity is introduced into the solid acid by direct chemical substitution with variable valence ions as described earlier. For example, a portion of the phosphorous, silicon or germanium might be replaced with ions that exhibit variable valence states, such as manganese. Similarly, a portion of the alkali or alkaline earth metals might be replaced with large variable valence ions such as thallium, indium, lead and tin. The solid acid so modified may be used in an electrochemical device directly or may be combined with a supporting matrix material as a composite as discussed above.

Although the above discussion has focussed on the solid acid electrolyte materials of the current invention, and methods of forming such materials, the present invention is also directed to electrochemical devices incorporating such materials and membranes. Embodiments of some exemplary devices are shown in FIGS. 11 to 15.

Figure 11:
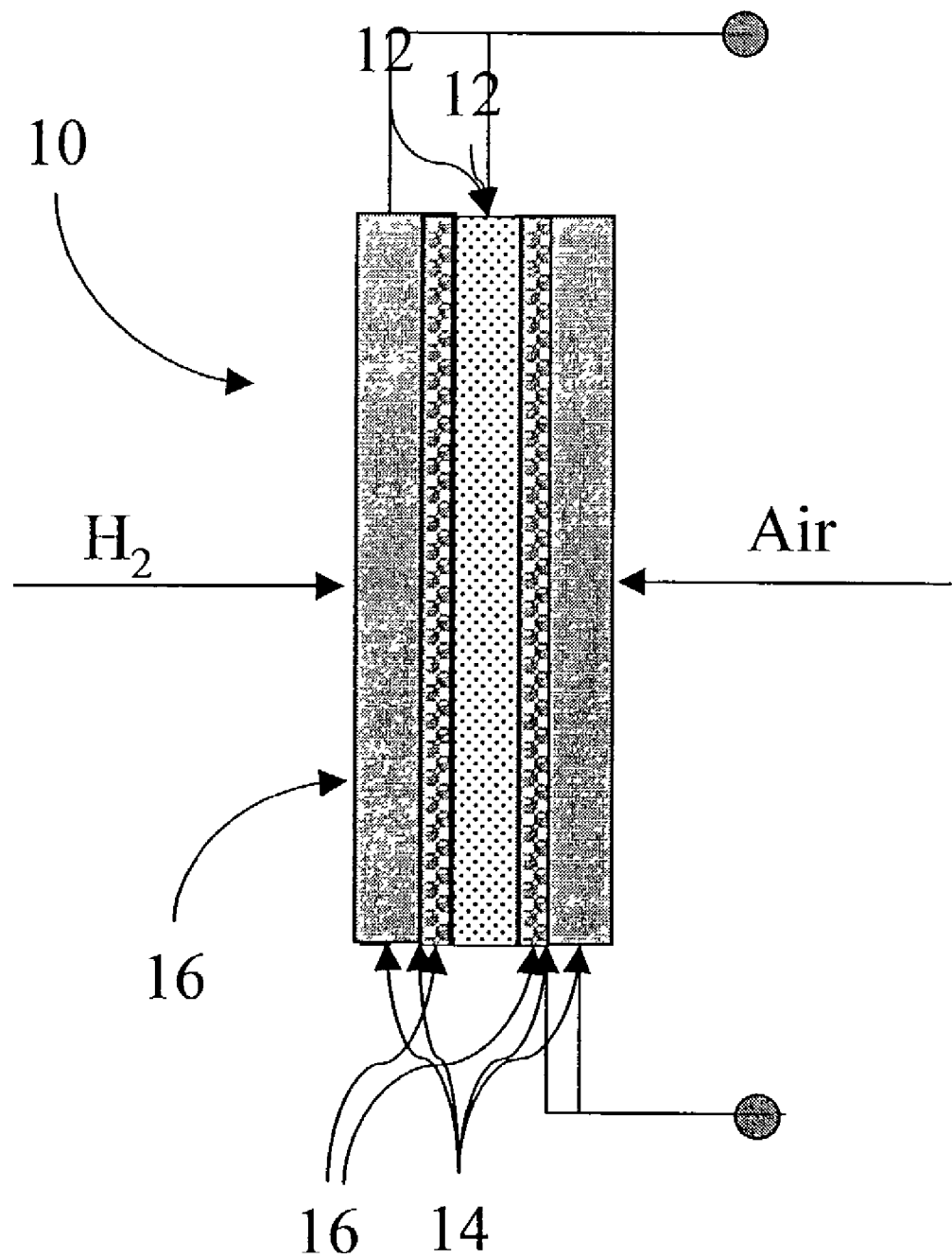
FIG. 11 shows a schematic of an exemplary hydrogen/air fuel cell using an exemplary solid acid electrolyte membrane according to the current invention.
Figure 12:
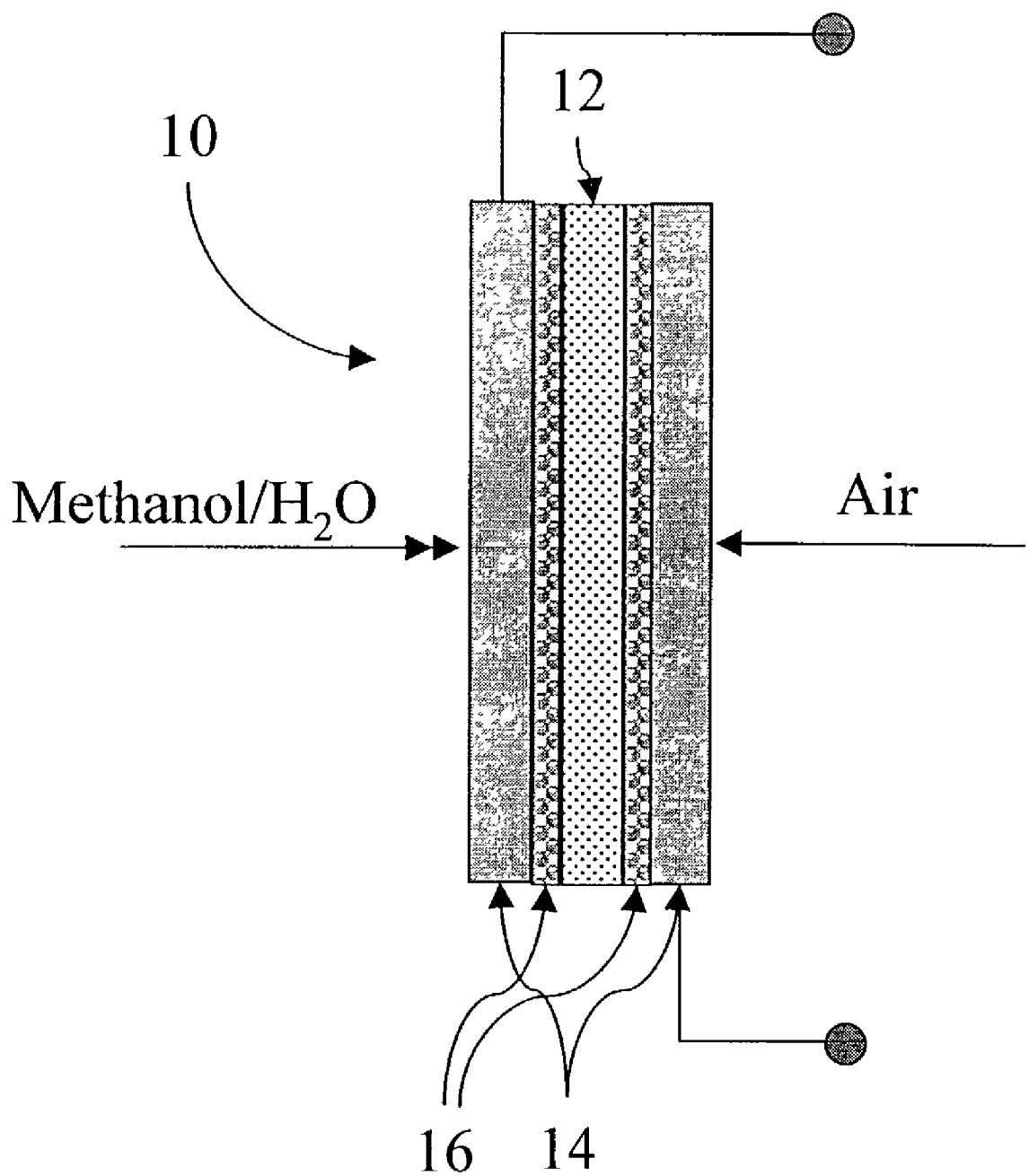
FIG. 12 shows a schematic of an exemplary direct methanol fuel cell using an exemplary solid acid supported by a binder according to the current invention.
Figure 13:
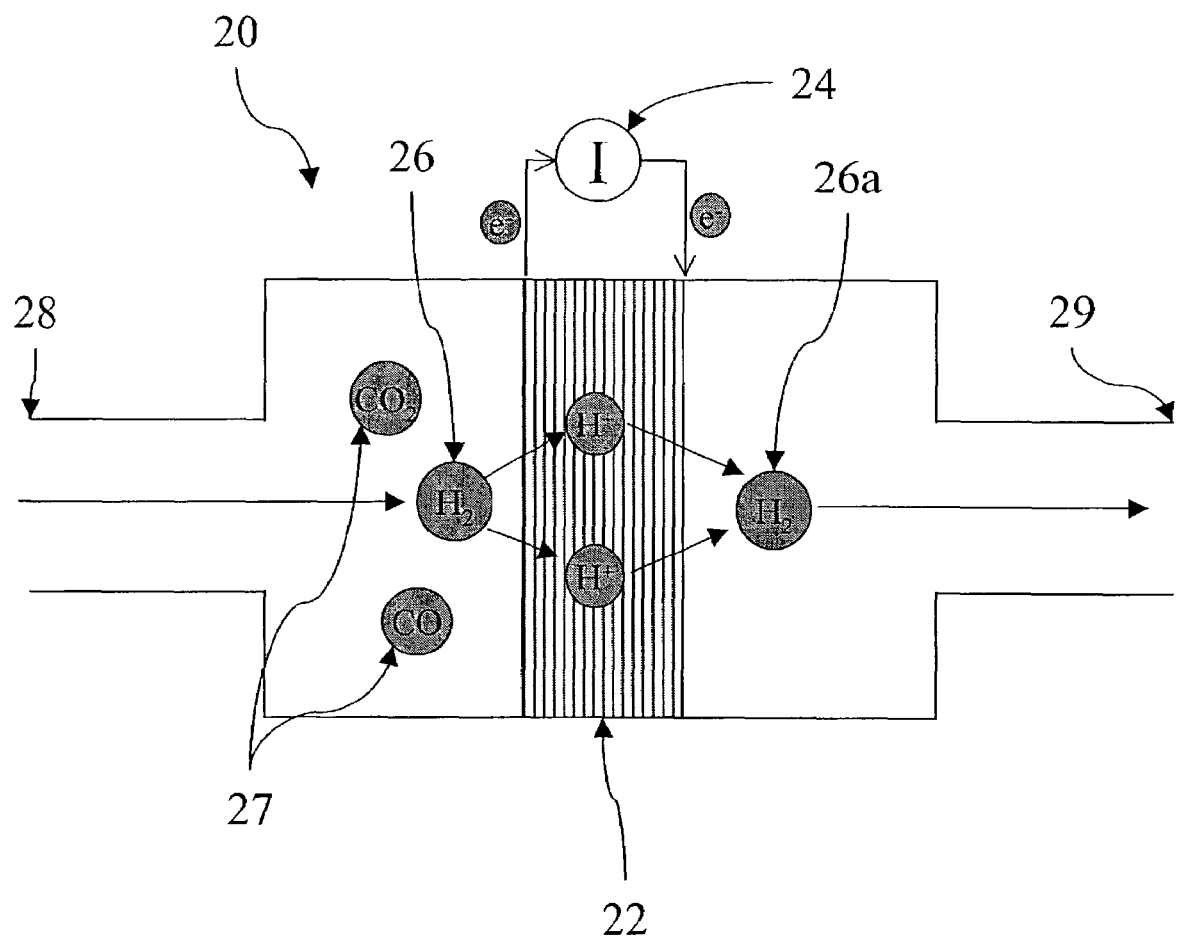
FIG. 13 shows a schematic of another exemplary hydrogen separation membrane using an exemplary proton conducting solid acid according to the current invention.

FIGS. 11 and 12 show exemplary embodiments of a hydrogen/air fuel cell and a methanol fuel cell 10, in which the proton conducting membrane 12 is a solid acid electrolyte, alone or in composite form, of the type described herein sandwiched between two graphite layers 14. Because the membrane 12 need not be humidified to operate, the fuel cell system can be quite simple. For example, as shown, no humidification system, normally required for conventional fuel cell utilizing conventional electrolyte materials such as Nafion, is required. In addition, less rigid temperature monitoring and control may be used in the fuel cell. Because the solid acid based membrane need not be humidified, the fuel cell may be operated at elevated temperatures, and such high temperatures can enhance the kinetics of the electrochemical reactions and allow the fuel cell to withstand higher concentrations of CO in the fuel. In contrast, conventional humidified fuel cells cannot be operated above the boiling point of water (100° C.).

Although use of the solid acid electrolyte materials in fuel cells is an important application, such materials may also be incorporated into various membrane reactors. For example, the Pt-based catalyst 16 in the hydrogen/air fuel cell shown in FIG. 11 is very sensitive to CO poisoning, particularly at temperatures close to ambient. Therefore, in an indirect hydrogen/air fuel cell, the hydrogen produced by the reformer is often cleaned of CO impurities before it enters the fuel cell. Accordingly, in one embodiment, shown schematically in FIG. 13, the material is shown incorporated into a hydrogen separation membrane for the removal of CO and other gases from hydrogen.

In this embodiment, the hydrogen separation membrane 20 is made of a proton conducting electrolyte 22 of the type described herein, and is connected to a current source 24. Hydrogen gas 26, mixed with other undesirable gases 27, is introduced onto one side (inlet) 28 of the membrane and clean hydrogen gas 26a is extracted from the other side of the membrane. In this embodiment, application of current causes the hydrogen gas to dissociate into H$^+$ and e$^-$. Because the membrane conducts only protons, these protons are the only species which can migrate through the membrane. The electrons migrate through the current source to the outlet side 29 of the membrane, where the H$^+$ combines with electrons from the current source to form hydrogen gas. Such membranes are substantially impervious to other gases and fluids. This overall hydrogen separation process is driven by the electric current applied from the current source 24.

Figure 14:
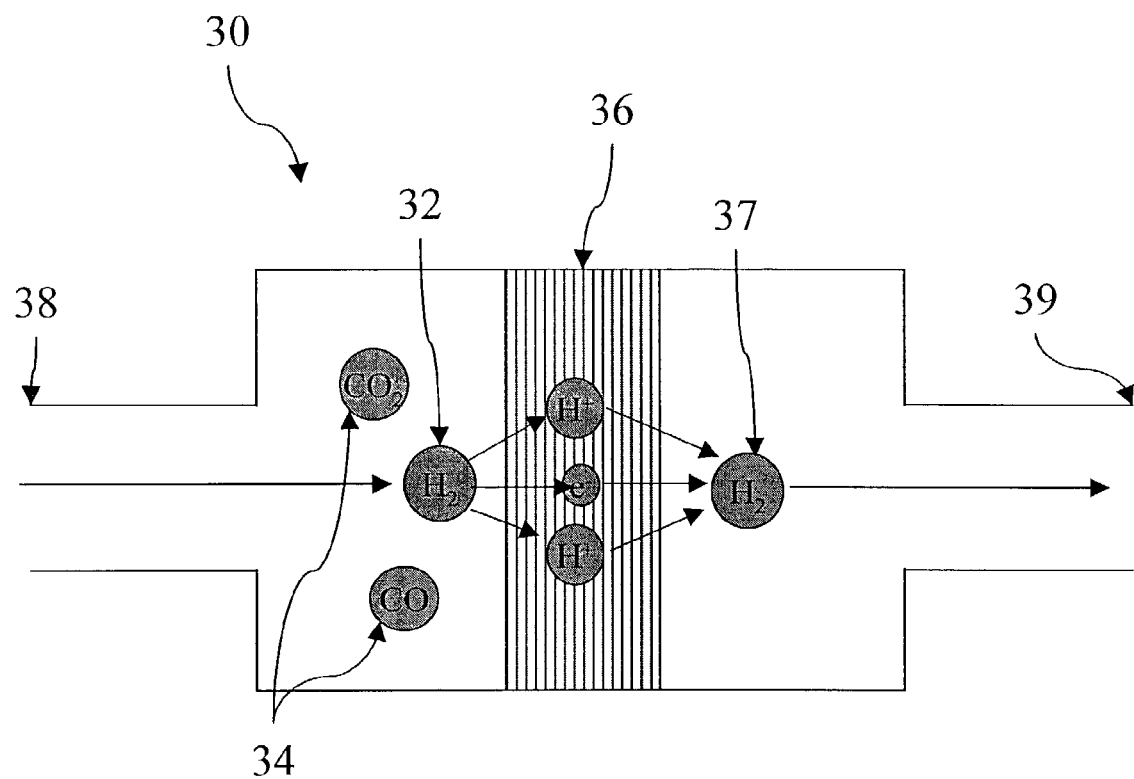
FIG. 14 shows a schematic of an exemplary hydrogen separation membrane using an exemplary mixed electron and proton conducting solid acid according to the current invention.

Another type of hydrogen separation membrane is shown in FIG. 14. In this embodiment, the hydrogen separation membrane 30 is made of a mixed proton and electron conducting membrane 36. Such a membrane might be made by including, for example, a given amount of a variable valence element, such as, Cr or Mn for X, to the solid acid, as described above. Alternatively, the membrane may be made as a composite in which the matrix substance may be an electronically conducting material, such as a conducting polymer, such as polyaniline, or a typical metal, such as aluminum or copper, or graphite.

Again, hydrogen gas 32, mixed with other undesirable gases 34 is introduced onto one side of the membrane 36, and clean hydrogen gas 37 is extracted from the other side of the membrane. During operation, on the inlet 38 side of the membrane 36 hydrogen gas is dissociated in H$^+$ and e$^-$. Because the membrane 36 is both proton conducting and electron conducting, both of these species migrate through the membrane. Again, however, the membrane is substantially impermeable to other gases and fluids 34. Hence, CO and other undesirable gases or fluids cannot so migrate. Meanwhile, the H$^+$ and e$^-$ recombine to form hydrogen gas. The overall process is driven by the hydrogen chemical potential gradient, which is high on the inlet side of the membrane and low on the outlet side 39 of the membrane.

Figure 15:
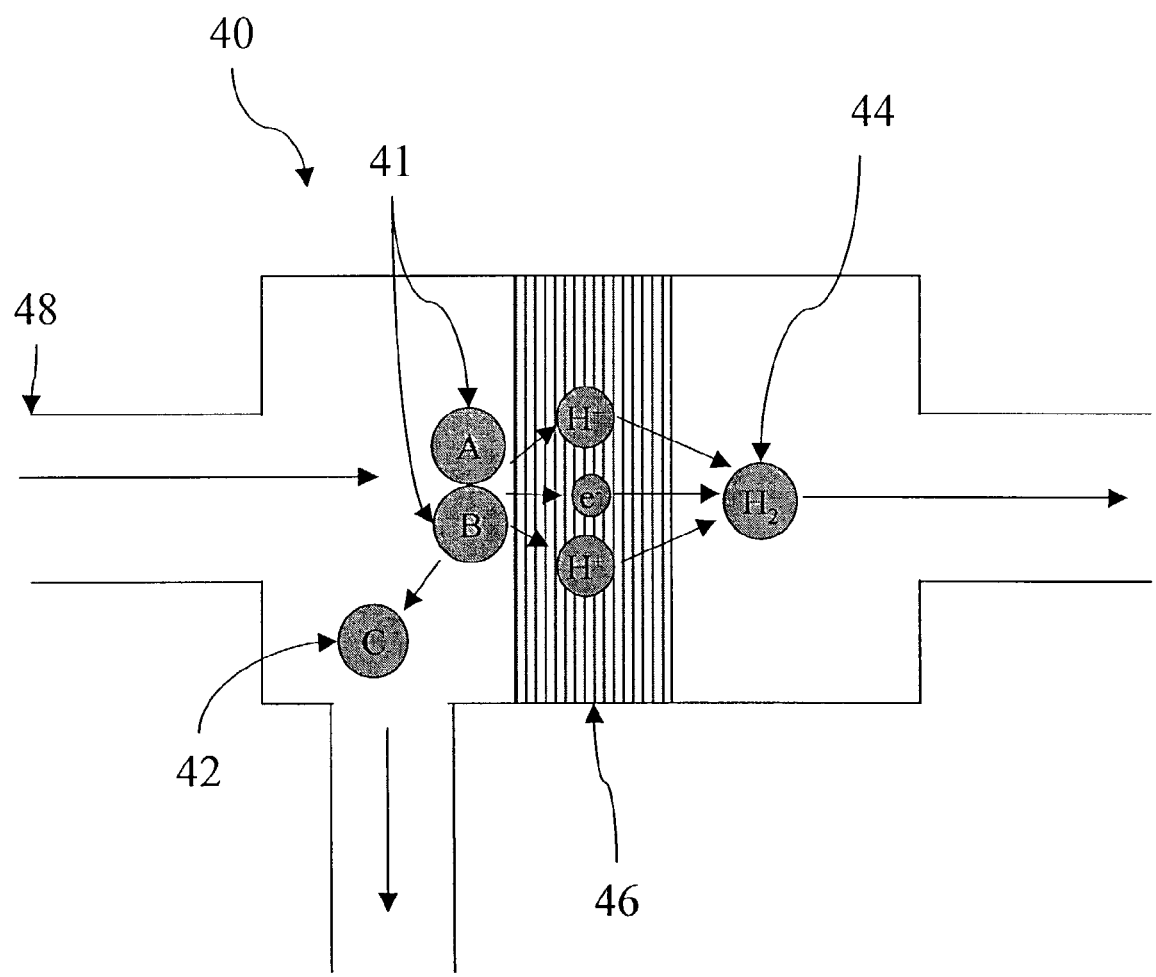
FIG. 15 shows a schematic of an exemplary embodiment of a membrane reactor using an exemplary solid acid according to the current invention.

Finally, in FIG. 15, schematic diagrams of membrane reactors incorporating the electrolyte materials of the current invention are shown. In FIG. 15, a membrane reactor in which a mixed proton and electron conducting membrane of the type described above is utilized. The general reaction carried out in this reactor follows the following form:

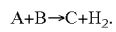

$$A+B \rightarrow C+H_2.$$

Use of a mixed proton and electron conducting membrane in this reactor can enhance the reaction, giving yields that exceed thermodynamic equilibrium values. On the inlet side of the membrane reactor 40, the reactants 41 form products C 42 and H$_2$ 44. Under equilibrium conditions, the hydrogen concentration builds up and the forward reaction is slowed. With the use of the mixed hydrogen and electron conducting membrane 46, the hydrogen 44 is immediately extracted from the reaction region 48 via transport through the membrane and the forward reaction is enhanced.

Examples of such reaction in which yield could be enhanced by using such a membrane reactor include:

1) The steam reformation of methane to produce syngas according to:

$$CH_4 + H_2O \rightarrow CO + 3H_2$$

2) The steam reformation of CO to produce $CO_2$ and $H_2$:

$$CO + H_2O \rightarrow CO_2 + H_2$$

3) The decomposition of hydrogen sulfide:

$$H_2S \rightarrow H_2 + S$$

4) The dehydrogenation of propane to polypropylene; and 5) the dehydrogenation of alkane and aromatic compounds to various products.

Although one exemplary embodiment of a membrane reactor is discussed above in relation to FIG. 15, the membrane of the current invention may be used in other reactions which utilize either a proton or a mixed proton and electron conducting membrane, such as, for example, in selective hydrogenation reactions.

Although specific embodiments are disclosed herein, it is expected that persons skilled in the art can and will design solid acid electrolytes and electrochemical devices utilizing such materials that are within the scope of the following description either literally or under the Doctrine of Equivalents.

What is claimed is:

1. A fuel cell comprising an electrolyte membrane operative in the presence of water vapor, wherein said electrolyte membrane comprises
   a solid acid having a crystal structure which becomes disordered with concomitant high conductivity upon achieving a superprotonic phase; and
   said electrolyte membrane being capable of operation at temperatures of at least 100° C. in the presence of water vapor.

2. An electrolyte membrane, said membrane comprising:
   a solid acid of the general form: $(M_xM'_{1-x})_3H_{3x}(YO_4)_2$, where M is any alkali or transition metal or other functional group having a +1 charge, M' is any alkaline earth or transition metal having a +2 charge, Y is selected from the group consisting of P, As, and mixture thereof, and X is less than or equal to 1; and
   said electrolyte membrane being capable of operation at temperatures of at least 100° C.

3. An electrolyte membrane, said membrane comprising:
   a solid acid of the general form: $M'_3H_{2x}[(Y_{1-x}A_x)O_4]_2$, where M' is any alkaline earth or transition metal having a +2 charge, A is one of either Si or Ge, Y is selected from the group consisting of P, As, and mixture thereof, and X is less than or equal to 1; and
   said electrolyte membrane being capable of operation at temperatures of at least 100° C.

4. The electrolyte membrane as described in claim 2, wherein M is selected from the group consisting of: Li, Na, K, Rb, Cs, Fr, and $NH_4$.

5. The electrolyte membrane as described in claim 2 or 3, wherein M' is selected from the group consisting of: Be, Mg, Ca, Sr, Ba, Ra, and Pb.

6. The electrolyte membrane as described in claims 2 or 3, further comprising a structural binder material.

7. The electrolyte membrane as described in claim 6, wherein the structural binder material is a species selected from the group consisting of: graphite, polymers, ceramics, glasses, and metals.

8. The electrolyte membrane as described in claims 2 or 3, further comprising a separate conducting material.

9. The electrolyte membrane as described in claim 8, wherein the conducting material is selected from the group consisting of: conducting polymer, metals and an electronically conducting carbon material.

10. The electrolyte membrane as described in claims 2 or 3, wherein said solid acid includes at least one variable valence element.

11. The electrolyte membrane as described in claims 2 or 3 wherein said solid acid is water insoluble.

12. The electrolyte membrane as described in claims 2 or 3, wherein said solid acid is thermally stable at temperatures above 100° C.

13. The electrolyte membrane as described in claims 2 or 3, wherein said solid acid conducts protons.

14. The electrolyte membrane as described in claims 2 or 3, wherein said solid acid has a proton conductivity of about $10^{-5}$ $\Omega^{-1}$ $cm^{-1}$ or higher at the temperature of utilization.

15. The electrolyte as described in claim 2 or 3, wherein said solid acid conducts both protons and electrons.

16. An electrochemical device incorporating the solid acid electrolyte membrane described in any of claim 2 or 3.

17. The electrochemical device as described in claim 16, wherein the device is selected from the group consisting of: fuel cells, batteries, hydrogen separation membranes, and membrane reactors.

18. An electrolyte membrane, said membrane comprising:
   i) a solid acid of the general form: $(M_xM'_{1-x})_3H_{3x}(YO_4)_2$, wherein M is an alkali or a transition metal or other functional group having a +1 charge, M' is an alkaline earth or a transition metal having a +2 charge; Y is selected from the group consisting of P, As, and mixture thereof; and X is less than or equal to 1;
   ii) a separate conducting material selected from the group consisting of a conducting polymer, a metal and an electronically conducting carbon material; and
   iii) said electrolyte membrane being capable of operation at temperatures of at least 100° C.

19. An electrolyte membrane, said membrane comprising:
   i) a solid acid of the general form: $(M_xM'_{1-x})_3H_{3x}(YO_4)_2$, where M is any alkali or transition metal or other functional group having a +1 charge, M' is any alkaline earth or transition metal having a +2 charge; Y is selected from the group consisting of P, As, and mixture thereof; and x is less than or equal to 1; wherein said solid acid includes at least one variable valence element; and
   ii) said electrolyte membrane being capable of operation at temperatures of at least 100° C.

20. An electrolyte membrane, said membrane comprising:
   i) a solid acid of the general form: $(M_xM'_{1-x})_3H_{3x}(YO_4)_2$, where M is any alkali or transition metal or other functional group having a +1 charge, M' is any alkaline earth or transition metal having a +2 charge; Y is selected from the group consisting of P, As, and mixture thereof; and x is less than or equal to 1; wherein said solid acid includes at least one variable valence element; and
   ii) said electrolyte membrane being capable of operation at temperatures of at least 100° C. and conducting both protons and electrons.

21. An electrolyte membrane, said membrane comprising:
   i) a solid acid of the general form: $M'_3H_{2x}[(Y_{1-x}A_x)O_4]_2$, wherein M' is an alkaline earth or a transition metal having a +2 charge; A is Si or Ge; Y is selected from the group consisting of P, As, and mixture thereof; and x is less than or equal to 1;
   ii) a separate conducting material selected from the group consisting of a conducting polymer, a metal and an electronically conducting carbon material; and iii) said electrolyte membrane being capable of operation at temperatures of at least 100° C.

22. An electrolyte membrane, said membrane comprising:
i) a solid acid of the general form: $M'_3H_{2x}[(Y_{1-x},A_x)O_4]_2$, wherein M' is an alkaline earth or a transition metal having a +2 charge; A is Si or Ge; Y is selected from the group consisting of P, As, and mixture thereof; and x is less than or equal to 1; wherein said solid acid includes at least one variable valence element; and
ii) said electrolyte membrane being capable of operation at temperatures of at least 100° C.

23. An electrolyte membrane, said membrane comprising:
i) a solid acid of the general form: $M'_3H_{2x}[(Y_{1-x},A_x)O_4]_2$, wherein M' is an alkaline earth or a transition metal having a +2 charge; A is Si or Ge; Y is selected from the group consisting of P, As, and mixture thereof; and x is less than or equal to 1; wherein said solid acid includes at least one variable valence element; and
ii) said electrolyte membrane being capable of operation at temperatures of at least 100° C. and conducting both protons and electrons.

24. The fuel cell of claim 1, further comprising a structural binder material.

25. The fuel cell of claim 24, wherein the structural binder material is a species selected from the group consisting of: graphite, polymers, ceramics, glasses, and metals.

26. The fuel cell of claim 1, further comprising a separate conducting material.

27. The fuel cell of claim 26, wherein the conducting material is selected from the group consisting of: conducting polymer, metals and an electronically conducting carbon material.

28. The fuel cell as described in claim 1, wherein said solid acid is thermally stable at temperatures above 100° C.

29. The fuel cell as described in claim 1, wherein said solid acid conducts protons.

30. The fuel cell as described in claim 1, wherein said solid acid has a proton conductivity of about $10^{-5}$ $\Omega^{-1}$ $cm^{-1}$ or higher at the temperature of utilization.

31. The fuel cell as described in claim 1, wherein said solid acid conducts both protons and electrons.

32. An electrochemical device comprising an electrolyte membrane operative in the presence of water vapor, wherein said electrolyte membrane comprises
a solid acid having a crystal structure which becomes disordered with concomitant high conductivity upon achieving a superprotonic phase;
said electrolyte membrane being capable of operation at temperatures of at least 100° C.; and
wherein the electrochemical device is selected from the group consisting of a fuel cell, a hydrogen separation membrane, membrane reactors and an electrolysis cell
said electrolyte membrane of said fuel cell, said hydrogen separation membrane and said membrane reactor being in contact with an atmosphere containing water vapor; and
said electrolyte membrane of said electrolysis cell being in contact with water.

* * * * *